US008680994B2

(12) United States Patent
Leppanen et al.

(10) Patent No.: US 8,680,994 B2
(45) Date of Patent: Mar. 25, 2014

(54) METHOD FOR LOCATING VEGETATION HAVING A POTENTIAL TO IMPACT A STRUCTURE

(75) Inventors: Vesa Johannes Leppanen, Doylestown, PA (US); Adam Robert Rousselle, New Hope, PA (US); Hugh Andrew Clymer, Stowe, VT (US); Leighton Dalmasse, East Montpelier, VT (US); Brian Beck, Stowe, VT (US); Jari Kinnunen, Kulho (FI); Andrey Shipilov, Joensuu (FI)

(73) Assignee: Utility Risk Management Corporation, LLC, Stowe, VT (US)

( * ) Notice: Subject to any disclaimer, the term of this patent is extended or adjusted under 35 U.S.C. 154(b) by 249 days.

(21) Appl. No.: 13/341,089

(22) Filed: Dec. 30, 2011

(65) Prior Publication Data

US 2012/0169498 A1 Jul. 5, 2012

Related U.S. Application Data

(60) Provisional application No. 61/428,400, filed on Dec. 30, 2010.

(51) Int. Cl.
*G08B 21/00* (2006.01)
(52) U.S. Cl.
USPC .............. 340/540; 340/2.81; 340/6.1; 702/2; 706/52
(58) Field of Classification Search
USPC ................. 340/540, 2.81, 5.1, 6.1; 707/797, 707/E17.087; 702/155, 2, 5, 166; 47/23.1; 706/52, 54
See application file for complete search history.

(56) References Cited

U.S. PATENT DOCUMENTS

| 5,574,841 A | 11/1996 | Thompson et al. |
| 5,633,802 A | 5/1997 | Thompson et al. |

(Continued)

FOREIGN PATENT DOCUMENTS

| WO | WO2005/088252 A1 | 9/2005 |
| WO | WO2007/117654 A2 | 10/2007 |

(Continued)

OTHER PUBLICATIONS

Brandtberg et al., Detection and analysis of individual leaf-off tree crowns in small footprint, high sampling density lidar data from the eastern deciduous forest in North America, *Remote Sensing of Environment* (Jun. 12, 2002), 85:290-303.

(Continued)

*Primary Examiner* — Toan N Pham
(74) *Attorney, Agent, or Firm* — Pepper Hamilton LLP

(57) ABSTRACT

A method for designating vegetation as potential impact vegetation includes identifying data relating to target vegetation from a dataset and determining a reach distance of the target vegetation. The reach distance includes a distance from a point on a ground to a point of the target vegetation that is farthest from the point on the ground. The method also includes comparing the reach distance of the target vegetation with a closest distance between the point on the ground and a structure to produce a compared reach distance value and determining a health indicator value for the target vegetation. The method further includes comparing the health indicator value of the target vegetation to a health indicator threshold value and designating the target vegetation as having a potential to impact the structure based on the compared reach distance value and the comparison of the health indicator to the health indicator threshold.

27 Claims, 16 Drawing Sheets

(56) References Cited

U.S. PATENT DOCUMENTS

| | | | |
|---|---|---|---|
| 5,652,717 | A | 7/1997 | Miller et al. |
| 6,012,835 | A | 1/2000 | Thompson et al. |
| 6,338,027 | B1 | 1/2002 | Fulton |
| 6,563,122 | B1 | 5/2003 | Lüdeker et al. |
| 6,751,553 | B2 | 6/2004 | Young et al. |
| 6,792,684 | B1 | 9/2004 | Hyyppa |
| 6,975,942 | B2 | 12/2005 | Young et al. |
| 7,013,235 | B2 | 3/2006 | Hyyppä et al. |
| 7,046,841 | B1 | 5/2006 | Dow et al. |
| 7,180,517 | B2 | 2/2007 | Haynes |
| 7,187,452 | B2 | 3/2007 | Jupp et al. |
| 7,191,066 | B1 | 3/2007 | Rahmes et al. |
| 7,212,670 | B1 | 5/2007 | Rousselle |
| 7,216,003 | B2 | 5/2007 | Faulkner et al. |
| 7,248,342 | B1 | 7/2007 | Degnan |
| 7,324,104 | B1 | 1/2008 | Bitter et al. |
| 7,400,976 | B2 | 7/2008 | Young et al. |
| 7,474,964 | B1 | 1/2009 | Welty et al. |
| 7,539,605 | B2 | 5/2009 | Rahmes et al. |
| 7,574,024 | B2 | 8/2009 | Bitter et al. |
| 7,583,275 | B2 | 9/2009 | Neumann et al. |
| 8,352,410 | B2 * | 1/2013 | Rousselle et al. ............... 706/52 |
| 2004/0130702 | A1 | 7/2004 | Jupp et al. |
| 2004/0236535 | A1 | 11/2004 | Hyyppa et al. |
| 2005/0087110 | A1 | 4/2005 | Kobayashi et al. |
| 2005/0216237 | A1 | 9/2005 | Adachi et al. |
| 2005/0279069 | A1 | 12/2005 | Novembri et al. |
| 2005/0288872 | A1 | 12/2005 | Old et al. |
| 2007/0265781 | A1 | 11/2007 | Nemethy et al. |
| 2007/0291994 | A1 | 12/2007 | Kelle et al. |
| 2008/0062167 | A1 | 3/2008 | Boggs et al. |
| 2008/0133195 | A1 | 6/2008 | Rahmes et al. |
| 2008/0260237 | A1 | 10/2008 | Savolainen et al. |
| 2008/0304711 | A1 | 12/2008 | Scharf et al. |
| 2008/0319668 | A1 | 12/2008 | Welty et al. |
| 2008/0319673 | A1 | 12/2008 | Welty et al. |
| 2009/0103773 | A1 | 4/2009 | Wheeler et al. |
| 2009/0210205 | A1 | 8/2009 | Sullivan et al. |
| 2010/0205219 | A1 | 8/2010 | Rousselle et al. |

FOREIGN PATENT DOCUMENTS

| | | | |
|---|---|---|---|
| WO | WO2007/149250 | A2 | 12/2007 |
| WO | WO/2009025928 | A2 | 2/2009 |
| WO | WO2009/086158 | A2 | 7/2009 |
| WO | 2010111024 | A1 | 9/2010 |

OTHER PUBLICATIONS

Guggenmoos, Effects of Tree Mortality on Power Line Security, *Journal of Arboriculture* (Jul. 2003), 29(4):181-196.

Holmgren et al., Identifying species of individual trees using airborne laser scanner, *Remote Sensing of Environment* (Feb. 6, 2003), 90:415-423.

Hooper, Vegetation Management Takes to the Air: BC Hydro pilots the use of LIDAR and PLS-CADD to identify vegetation encroaching on transmission lines, *Transmission and Distribution World* (Sep. 2003), pp. 1-5.

Lee et al., A LiDAR-derived canopy density model for tree stem and crown mapping in Australian forests, *Remote Sensing of Environment* (Dec. 28, 2007), 111(4):493-518 (Abstract).

Morsdorf et al., LIDAR-based geometric reconstruction of boreal type forest stands at single tree level for forest and wildland fire management, *Remote Sensing of Environment* (Jul. 18, 2003), 92:353-362.

Moskal et al., Factsheet #1, Remote Sensing and Geospatial Application Laboratory, *Forest Inventory and stem characterization from terrestrial LiDAR*, University of Washington, Seattle, WA (2008), http://depts.washington.edu/rsgal.

Mu et al, Overview of powerlines extraction and surveillance using remote sensing technology, *Remote Sensing and GIS Data Processing* (Oct. 30, 2009), vol. 7498 (Abstract).

Persson et al., Detecting and Measuring Individual Trees Using an Airborne Laser Scanner, *Photogrammetric Engineering & Remote Sensing* (Sep. 2002), 68(9):925-932.

Solberg et al., Single Tree Segmentation Using Airborne Laser Scanner Data in a Structurally Heterogeneous Spruce Forest, *Photogrammetric Engineering & Remote Sensing* (Dec. 2006), 72(12):1369-1378.

PLS-CADD™ (Power Line Systems—Computer Aided Design and Drafting), Power Line Systems Inc., Madison, Wisconsin, http://www.powerline.com/products/pls_cadd.html (Printed from Internet Sep. 15, 2009).

Transmission Corridor Observation and Reporting (TCOR), GeoDigital's Transmission Corridor Observation & Reporting (TCOR) system is a unique, cost-effective approach to assuring regulatory compliance. A real time LiDAR system, TCOR offers rapid reporting and engineering quality data when required, GeoDigital http://www.geodigital.net/template_b.cfm?id=28 &action=published (Printed From Internet Sep. 15, 2009).

Network Mapping Projects, Power line projects, vegetation/falling tree analysis, Network Mapping Aerial Laser Survey http://www.network-mapping.com/powerlineprojects5.html (Printed from Internet Sep. 15, 2009).

ROW Keeper Software, Davey Resource Group, a Division of the Davey Tree Expert Company (Printed from Internet Mar. 1, 2012).

Transmission Vegetation Management Software, http://www.clearion.com/tvm.html (Printed from Internet Sep. 15, 2009).

Clearion Vegetation Management for Electric Distribution, http://www.clearion.com/dvm.html (Printed from Internet Sep. 15, 2009).

Vegetation LiDAR, GeoDigital's LiDAR system is faster, more efficient and more cost-effective than conventional LiDAR and light years ahead of other survey technologies used in the industry such as photogrammetry and ground survey, GeoDigital http://www.geodigital.net/template_b.cfm?id=75&action=publication (Printed from Internet Sep. 16, 2009).

Poulos et al., "Decision Support for Mitigating the Risk of Tree Induced Transmission Line Failure in Utility Rights-of-Way," *Environmental Management*, Springer-Verlag, NE, vol. 45, No. 2, Jan. 20, 2010, pp. 217-226.

Kobayashi et al., "The Utilization of Satellite Images to Identify Trees Endangering Transmission Lines," *IEEE Transactions of Power Delivery*, IEEE Service Center, New York, NY, vol. 24, No. 3, Jul. 1, 2009, pp. 1703-1709.

PCT/US2011/068085 International Search Report dated May 22, 2012.

* cited by examiner

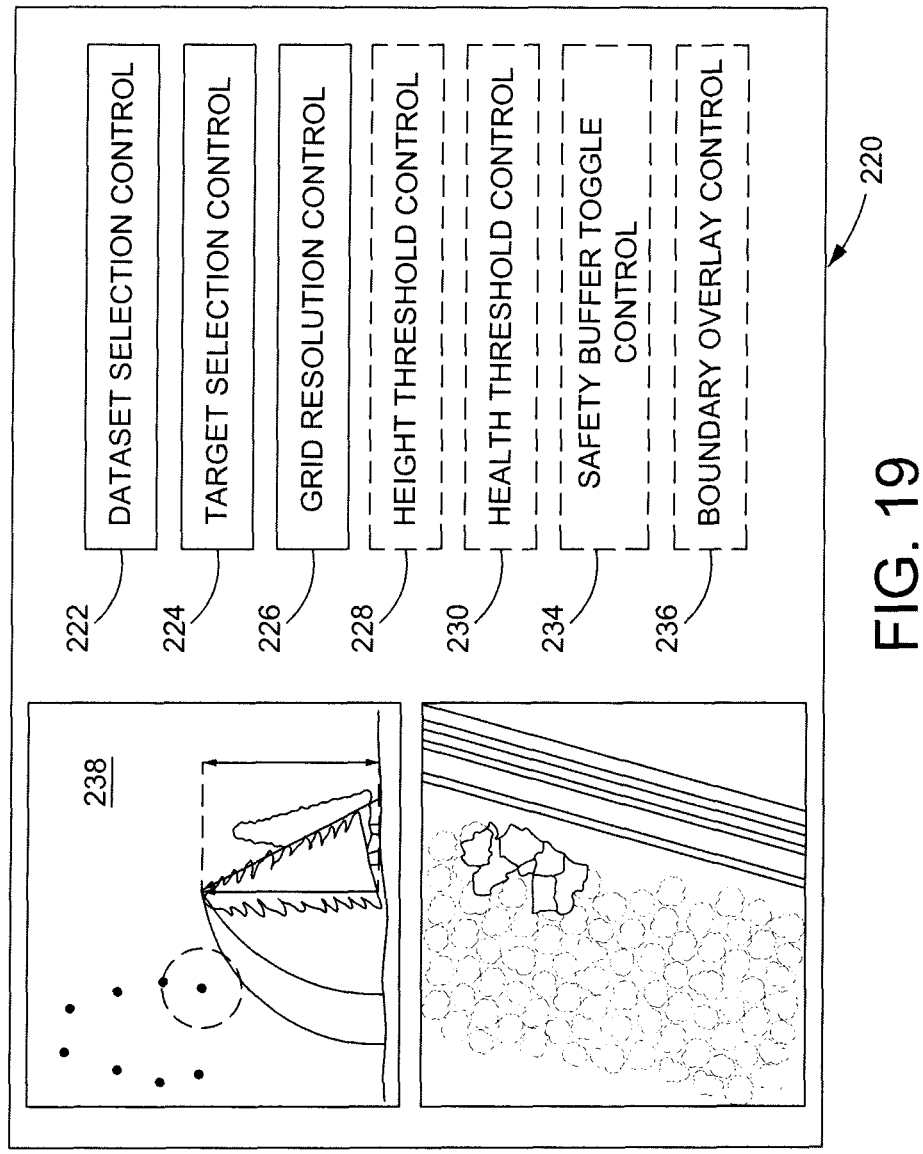

METHOD FOR LOCATING VEGETATION HAVING A POTENTIAL TO IMPACT A STRUCTURE

CROSS-REFERENCE TO RELATED APPLICATIONS

This application claims priority from pending U.S. Provisional Patent Application 61/428,400, entitled "HAZARD TREE FINDER," filed on Dec. 30, 2010, the disclosure of which is incorporated by reference herein in its entirety.

This application is also related to pending U.S. patent application Ser. No. 12/570,779, entitled "METHOD AND SYSTEM FOR LOCATING A STEM OF A TARGET TREE," filed on Sep. 30, 2009, the disclosure of which is incorporated by reference herein in its entirety.

BACKGROUND

The maintenance of overhead wires, such as utility lines, phone lines, and communication lines, may incur problems from trees which may pose a risk of falling upon the wires or other structures. It is understood, however, that not all trees which have the potential to fall will actually fall and either obstruct or damage a line or structure. In addition, it is socially, environmentally, and economically unfeasible to trim or remove all trees which have the potential to fall. Accordingly, trees which have the potential to fall may be further evaluated using additional criteria which may identify the trees as "hazard trees," "danger trees," "risk trees," or "trees of interest," hereinafter referred to as "hazard trees" in this document. The criteria for identifying whether a tree is a hazard tree may include: whether the tree can reach the line or structure if it fell toward the line or structure; the health of the tree; and the probability of the tree falling toward the line based on the lean or position of the tree.

Current systems and methods, which visually identify trees as hazard trees by field patrolling large areas on the ground and via helicopter patrols, may be inaccurate, incur large costs and are time consuming. For example, ground patrols may fail to identify trees that are inside tall-dense growth or positioned at an unfavorable angle. Helicopter patrols are costly and do not always provide an ideal perspective for identifying the area of a fall within reach of the tree.

This document describes methods and systems that are directed to solving at least some of the problems described above.

SUMMARY

In an embodiment, a method for designating vegetation as potential impact vegetation includes identifying, via a processor, data relating to target vegetation from a dataset and determining, by the processor, a reach distance of the target vegetation. The reach distance includes a distance from a point on a ground to a point of the target vegetation that is farthest from the point on the ground. The method also includes comparing, by the processor, the reach distance of the target vegetation with a closest distance between the point on the ground and a structure to produce a compared reach distance value and determining a health indicator value for the target vegetation. The method further includes comparing the health indicator value of the target vegetation to a health indicator threshold value and designating the target vegetation as having a potential to impact the structure based on the compared reach distance value and the comparison of the health indicator to the health indicator threshold.

In some embodiments, the point on the ground is a point where the target vegetation grows out of the ground. In other embodiments, the point on the ground is a point substantially directly below the point of the target vegetation.

In some embodiments, the closest distance between the point on the ground and the structure is a base distance and designating the target vegetation includes designating the target vegetation as having a potential to impact the structure if the reach distance is greater than or equal to the base distance.

In some embodiments, the closest distance between the point on the ground and the structure is a base distance and designating the target vegetation includes designating the target vegetation as having a potential to impact the structure if the reach distance is greater than or equal to the base distance less a threshold distance. The threshold distance may be equal to a predetermined distance extending from the structure.

In some embodiments, identifying data relating to target vegetation from a dataset includes identifying segments of the target vegetation. Optionally, identifying the segments includes filtering segmentation input data with a filter that alters a number of inputs to the filter operator or weights of individual entries among the inputs, based on one or more vegetation properties corresponding to a filter location. Optionally, identifying the segments includes, for each identified segment, altering one or more segmentation parameters of the segment based on one or more properties of a seed point from which the segment is started.

In some embodiments, determining a health indicator value for the target vegetation includes determining, by the processor, the health indicator value for the target vegetation and comparing the health indicator value of the target vegetation includes comparing, by the processor, the health indicator value of the target vegetation with the health indicator threshold value.

In some embodiments, determining a health indicator value for the target vegetation includes calculating a color difference between an analyzed pixel and a determined reference color. Optionally, determining the health indicator value for the target vegetation further includes analyzing aerial image data that includes at least one of R-G-B image data, CIR image data, and spectrometric image data.

In some embodiments, the method also includes at least one of: notifying a user of a possible impact upon the structure by the target vegetation; displaying one or more possible points of impact upon the structure by the target vegetation; attributing a target vegetation database with an impact table record that describes an impact between the target vegetation and the structure; and displaying an indication that the target vegetation on a map has potential to impact the structure.

In some embodiments, the target vegetation includes a tree and a tree crown, and the structure includes a power line, a communications line, a road, or a railroad track.

In some embodiments, determining the health indicator value includes determining the health indicator value from at least one of imaged data of the target vegetation and field observation of the target vegetation.

In some embodiments, identifying data relating to target vegetation from a dataset includes identifying the target vegetation from a dataset that includes light detection and ranging (LiDAR) data, laser scanning data, radar data, synthetic aperture radar data, data from a sensor based on scanning distance-measurement and providing point clouds, digital imagery, video, or hyperspectral imaging data.

In some embodiments, the predetermined distance extending from the structure includes a value associated with a safety buffer zone. The safety buffer zone includes at least one of: a power line safety buffer zone, a railroad track safety buffer zone, a railroad overhead conductor safety buffer zone, a phone line safety buffer zone, a phone line safety buffer zone, a road safety buffer zone, a highway safety buffer zone, and a communication cable safety buffer zone.

In an embodiment, a tangible computer readable storage medium includes instructions for instructing a processor to identify data relating to target vegetation from a dataset and determine a reach distance of the target vegetation. The reach distance includes a distance from a point on the ground to a point of the target vegetation that is farthest from the point on the ground. The instructions also instruct the processor to compare the reach distance of the target vegetation with a closest distance between the point on the ground and a structure to produce a compared reach distance value and determine a health indicator value for the target vegetation. The instructions also instruct the processor to compare the health indicator value of the target vegetation with a health indicator value threshold and designate the target vegetation as having a potential to impact the structure based on the compared reach distance value and the comparison of the health indicator to the health indicator threshold.

In some embodiments, the closest distance between the point on the ground and the structure is a base distance and the instruction to designate the target vegetation includes designating the target vegetation as having a potential to impact the structure if the reach distance is greater than or equal to the base distance.

In some embodiments, the closest distance between the point on the ground and the structure is a base distance and the instruction to designate the target vegetation includes designating the target vegetation as having a potential to impact the structure if the difference between the base distance and the reach distance is greater than or equal to a threshold distance. The threshold distance is equal to a predetermined distance extending from the structure.

In some embodiments, the instruction to identify data relating to target vegetation from a dataset includes designating segments of the target vegetation. Optionally, designating segments of the target vegetation includes adaptive filtering. Optionally, designating segments of the target vegetation includes adaptive thresholding.

In some embodiments, the instruction to determine a health indicator value for the target vegetation includes calculating a color difference between an analyzed pixel and a determined reference color.

In an embodiment, a system for designating vegetation as potential impact target vegetation includes a processor configured to identify data relating to target vegetation from a dataset and determine a reach distance of the target vegetation. The reach distance includes a distance from a point on the ground to a point of the target vegetation that is farthest from the point on the ground. The processor is also configured to compare the reach distance of the target vegetation with a closest distance between the point on the ground and a structure to produce a compared reach distance value and determine a health indicator value for the target vegetation. The processor is further configured to compare the health indicator value of the target vegetation with a health indicator value threshold and designate the target vegetation as having a potential to impact the structure if the reach distance is greater than or equal to the reach distance threshold and if the health indicator deviates from the health indicator threshold. The system also includes a data input coupled to the processor and configured to provide the processor with the dataset. The system further includes a user interface coupled to at least one of the processor and the data input.

In some embodiments, the system further includes a data sensing device selected from a group comprising a light detection and ranging (LiDAR) system, a laser scanning system, a radar system, a synthetic aperture radar system, a system using a sensor based on scanning distance-measurement and providing 3D point clouds, a digital imaging system, and a hyperspectral imaging system.

In some embodiments, the structure includes at least one of a power line, a railroad track, a railroad overhead conductor, a phone line, a phone line, a road, a highway, and a communication cable.

In some embodiments, the processor is further configured to select at least one action from a group of actions comprising: notifying a user of a possible impact upon the structure by the target vegetation; displaying one or more possible points of impact upon the structure by the target vegetation; attributing a target vegetation database with an impact table record that describes an impact between the target vegetation and the structure; and displaying an indication that the target vegetation on a map has potential to impact the structure.

BRIEF DESCRIPTION OF THE DRAWINGS

FIG. 19 is a schematic illustration of a graphical user interface (GUI) for locating a tree having the potential to impact a structure.

DETAILED DESCRIPTION

As used in this document, the singular forms "a," "an," and "the" include plural references unless the context clearly dictates otherwise. Unless defined otherwise, all technical and scientific terms used in this document have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

A "computing device" refers to a computer, a processor and/or any other component, device or system that performs one or more operations according to one or more programming instructions.

"Vegetation" refers to any type of vegetation including trees, tree crowns, and non-tree vegetation, such as, weeds, grasses, vines and bushes.

A "hazard tree" refers to a tree that, based on at least one condition, includes a risk of falling on to a power line, a communications line, or other structure.

A tree's "crown" refers to the branches, leaves, and reproductive structures extending from the trunk or stem of the tree.

As used in this document, "a network" may be a wired or wireless communications network such as a local area network, a wide area network, an intranet, the Internet or another network.

Figure 1:
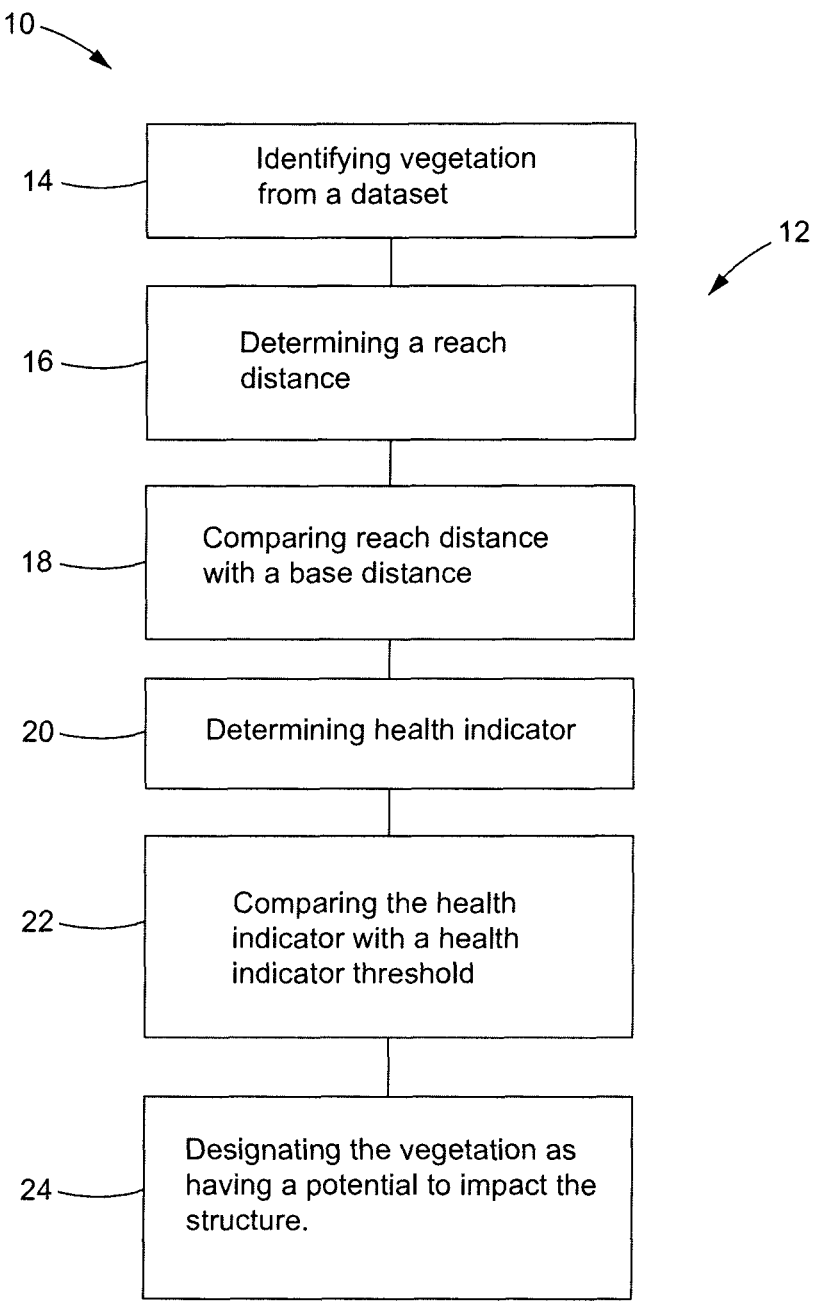
FIG. 1 is a flowchart illustrating a method for locating vegetation having a potential to impact a structure.

FIG. 1 is a flowchart illustrating a method for designating vegetation as potential impact vegetation, which may be vegetation having a potential to impact a structure. As shown at FIG. 1, the method 12 may include identifying, via a processor, data relating to target vegetation from a dataset, as shown at block 14. Vegetation, (i.e. one or more trees) and height, H, of the vegetation may be identified. The vegetation, such as a tree, may be identified from a dataset, which may include data representing the location and height of a set of target trees. The dataset may also include the location and height of a structure located adjacent to or in proximity of the target trees, as well as other parameters. The dataset may include a set of data that is sensed by one or more sensors.

Figure 2:
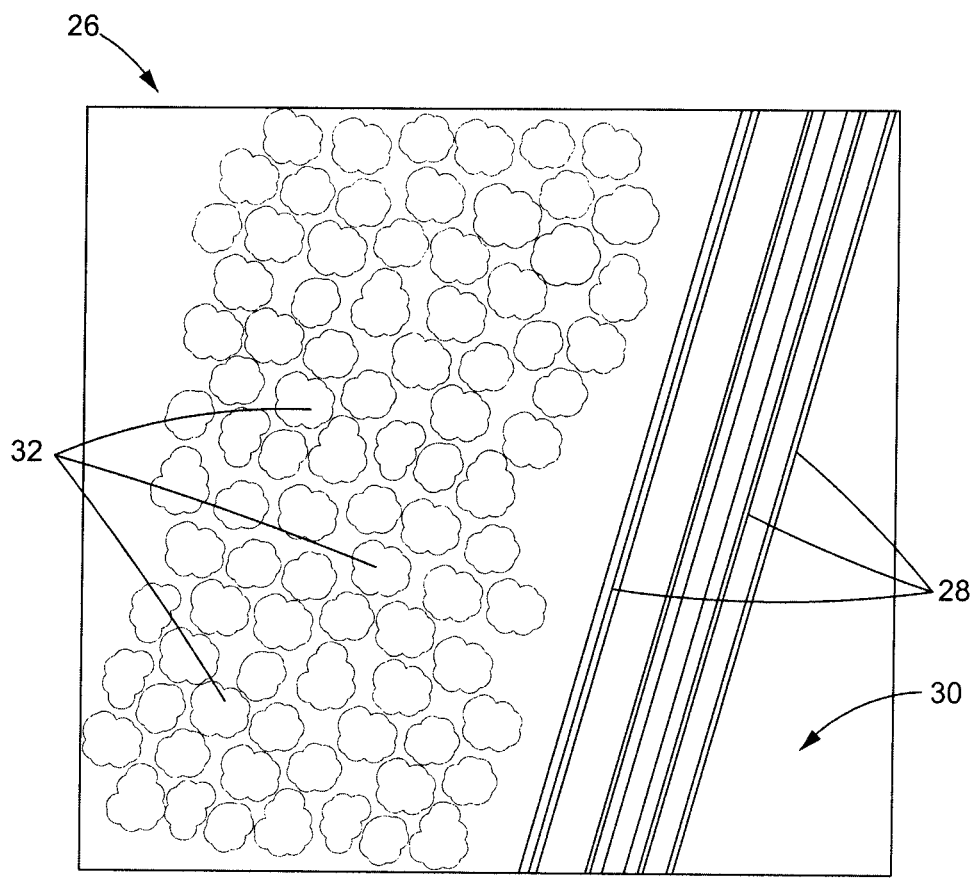
FIG. 2 is an aerial view illustrating a dataset.

FIG. 2 is an aerial view illustrating a dataset 26. Dataset 26 may include a structure of interest 28, such as one or more power lines, which are shown directed along a right-of-way (ROW) 30. Dataset 26 may also include a plurality of trees 32 adjacent to or in proximity of the structure of interest 28. Dataset 26 may be a three-dimensional dataset that includes data obtained serially from a position above the trees 32. A dataset may also include data obtained via ground-based sensing techniques. A dataset may be obtained from one or more LiDAR (Light Detection and Ranging) sensors. The dataset may include, for example, one or more classified 3D point cloud LiDAR datasets. A dataset may also be obtained via a combination of aerial and ground-based sensing data gathering techniques.

A dataset 26 may include a variety of data types, such as, but not limited to, light detection and ranging (LiDAR) data (sometimes called "laser scanning data"), radar data, synthetic aperture radar data, data from any sensor based on scanning distance-measurement and providing 3D point clouds, digital imagery, or hyperspectral imaging data, among other sources. The sensing dataset 26 may also be supported by other datasets, for example, digital imagery, video, and/or hyperspectral imaging data. A dataset may also include positioning data, for example, global positioning system (GPS) data, whereby coordinate locations of objects and structures within the sensing dataset are known. Additionally, a dataset may be combined with known structure data, for example, utility system locations, railroad locations, or road locations. For example, the locations of known power lines 28 and ROW 30 at FIG. 2 have been combined with dataset 26 so that a reference to the locations of the power lines 28 may be made.

A tree may be identified as a target tree by identifying and investigating the tree's crown, for example, from LiDAR or other data sources. A tree's crown may include a projected crown area or polygon that can be geographically referenced and which contains an area of a tree.

Tree crown identification may be fully automated, partially automated, or performed manually. Tree crown identification software available at Trimble GeoSpatial, Trappentreustr 1, 80339 Munich, Germany may be used for tree crown identification. A highest point in a tree crown may be identified by examining LiDAR height data within a tree crown. The crown of a tree may be identified in a dataset as a polygon or an area defined by a set of labeled pixels. In a dataset, a tree crown, or a polygon associated with a tree crown, may have attributes linked to it, for example, maximum height, stem locations, or tree health indicators. In the field, a tree crown may contain one or more tree stems or, in some cases, be supported by a large distinct tree branch.

Figure 3:
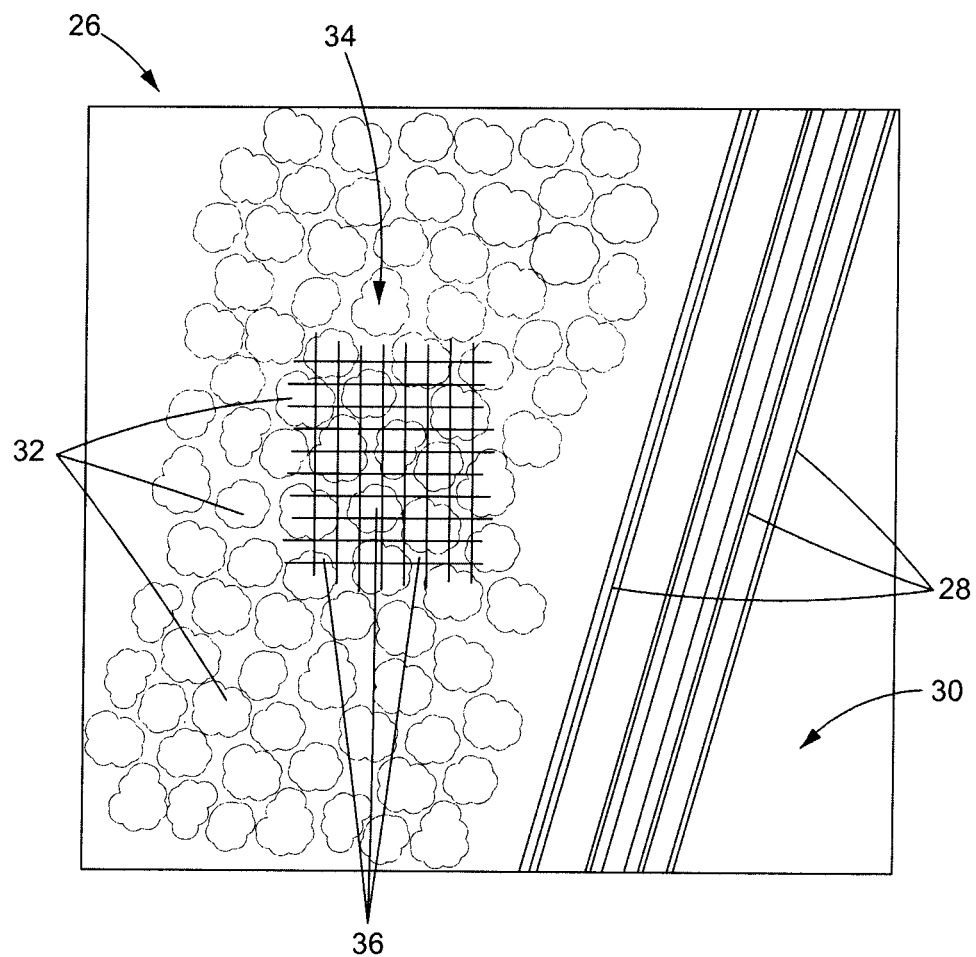
FIG. 3 illustrates an exemplary pixel grid overlaying a portion of the trees from the dataset shown at FIG. 2.

Identifying data relating to target vegetation from a dataset may include identifying segments of the target vegetation. Identifying trees and tree crowns may include automatic segmentation from rasterized vegetation height data, such as for example, a rectangular array of pixels representing vegetation height data. The dataset obtained from a LiDAR dataset may be manipulated by masking and filtering to provide masked and filtered, rasterized tree crown data. Automatic segmentation may include overlaying or mapping a pixel grid onto the LiDAR vegetation data (also referred to as "a LiDAR return"). For example, FIG. 3 illustrates an exemplary pixel grid 34 having substantially square pixels 36, overlaying a portion of the trees 32 from dataset 26. The grid resolution of pixel grid 34 is merely illustrative for describing embodiments in this document. A pixel grid resolution may range from 0.05 meters to about 2 meters per pixel, and in some embodiments, from about 0.2 meters to about 0.6 meters per pixel.

Figure 4:
FIG. 4 is a graphical illustration of a dataset that may be obtained from Light Detection and Ranging (LiDAR) sensing.

A vegetation (or tree) height or altitude of the vegetation from ground may be obtained from the LiDAR dataset 26 and attributed to each of the pixels 36 in pixel grid 34. The height data obtained from LiDAR dataset 26 may be filtered to minimize the number of data points and to direct attention to the most significant vegetation or trees. For example, adaptive filtering may be employed. FIG. 4 is a graphical illustration 40 of a dataset that may be obtained from LiDAR sensing, such as from a LiDAR sensor available from IGI mbH, Langenauer Str. 46, 57223 Kreurtal, Germany. As shown in FIG. 4, a LiDAR dataset may include images of vegetation, for example, trees and shrubs. In addition to spatial data, LiDAR data may include vegetation elevation or height data. Whether LiDAR is displayed on a video screen or printed in graphic form, relative height of the vegetation and other structures may be shown in graphical illustrations in a number of ways, such as for example, by shading, color shading or gray-scale shading.

Identifying the segments may include adaptive filtering. In automatic segmentation, filtering is used to remove undesirable variation in the data, such as individual branches inside a tree crown. Large trees may have coarser branch structure than smaller trees, causing individual branches to be segmented, while as smaller trees tend to get clustered in segments, if the same filtering parameters are used for small and large trees. Adaptive filtering may be applied to the LiDAR dataset to help achieve more accurate crown polygons. Adaptive filtering alters the filter size (i.e. the number of pixels included in the operator that calculates the filtered pixel value from a set of input pixel values or the operator weighing of the individual pixel values in the filter mask) based upon the detected height of the vegetation. For example, pixels 36 may include high height values corresponding to tall or high vegetation, such as tree 44. Pixels 36 may be filtered by selecting a larger number of pixels into the filter operator (i.e. a large mask). Pixels 36 may also include low height values corresponding to vegetation, such as tree 46. Pixels 36 may also be filtered by selecting a smaller number of pixels into the filter input (i.e. a smaller mask). Pixels 36 including even lower height values that correspond to vegetation, such as bush 48, may be filtered by selecting a very small number of pixels into the filter input (i.e. a small mask) or may be left unfiltered. When using adaptive filtering, a smaller number of pixels may be used for smaller vegetation or trees, letting small-scale canopy structures remain in the filtered output and allowing small segments to occur in later segmentation phases. A larger number of pixels may be used for larger vegetation or trees, yielding larger segments while omitting small canopy structures in the later segmentation phases, even if the surface of the larger tree crowns would have some gaps inside the crown structure. Filtering segmentation input data with a filter may alter a number of inputs to a filter operator or weights of individual entries among the inputs, based on one or more vegetation properties corresponding to a filter location.

Figure 5:
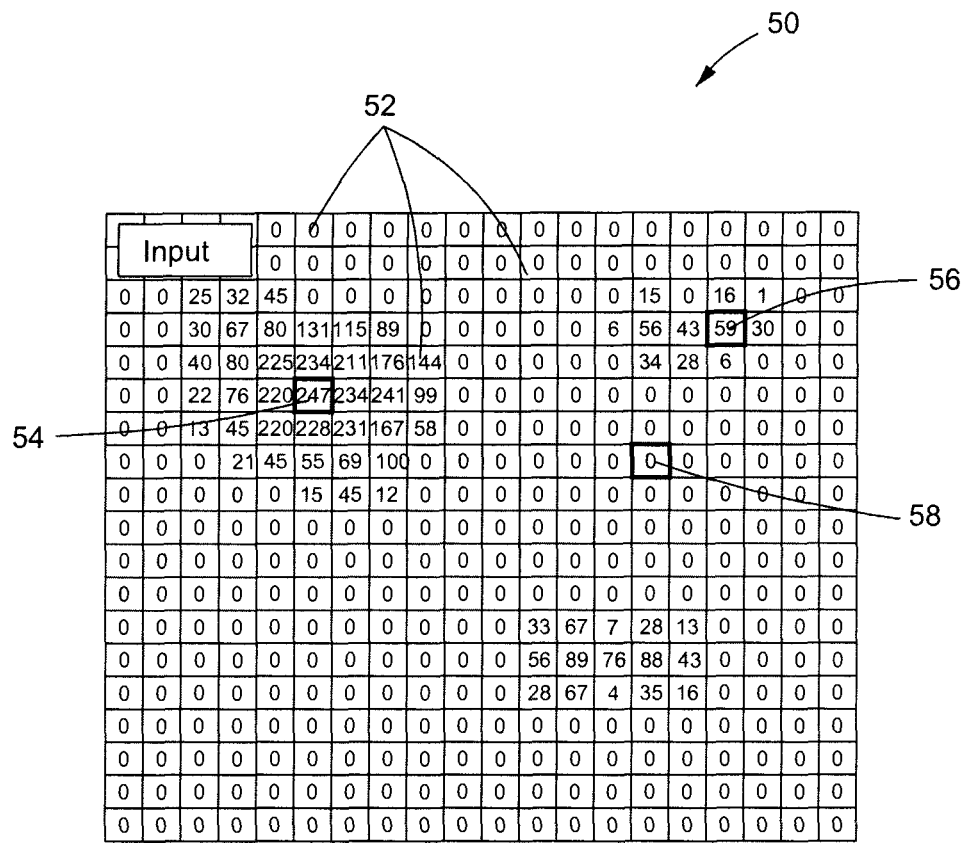
FIG. 5 illustrates a pixel grid that includes height data from a LiDAR dataset.

FIG. 5 illustrates a pixel grid 50 that includes vegetation height data from a LiDAR dataset. As shown in FIG. 5, pixel grid 50 includes a series of individual pixels 52 having associated vegetation or tree height data, for example, height values obtained from a LiDAR dataset. The individual pixels 52 of pixel grid 50, or the "raster layer" 50, may be spatially referenced to each other, and to a common spatial reference, such as the location of a utility pole or substation. The pixel grid 50 may be stored in an image format, such as Tagged Image File Format (TIFF) or a similar format. This raster layer 50 may be referred to as a "vegetation height raster" 50. In the vegetation height raster 50, tree tops may be represented as local maximum height values. As shown in FIG. 5, pixel 54 may be associated with a relatively large height value such as "247," pixel 56 may be associated with a smaller height value "59," while pixel 58 may be associated with a "0" or other height value. For segmentation, the height values do not need to represent any length scale, but can be scaled for example between 0 and 255, 255 representing the height of tallest possible tree.

Figure 6:
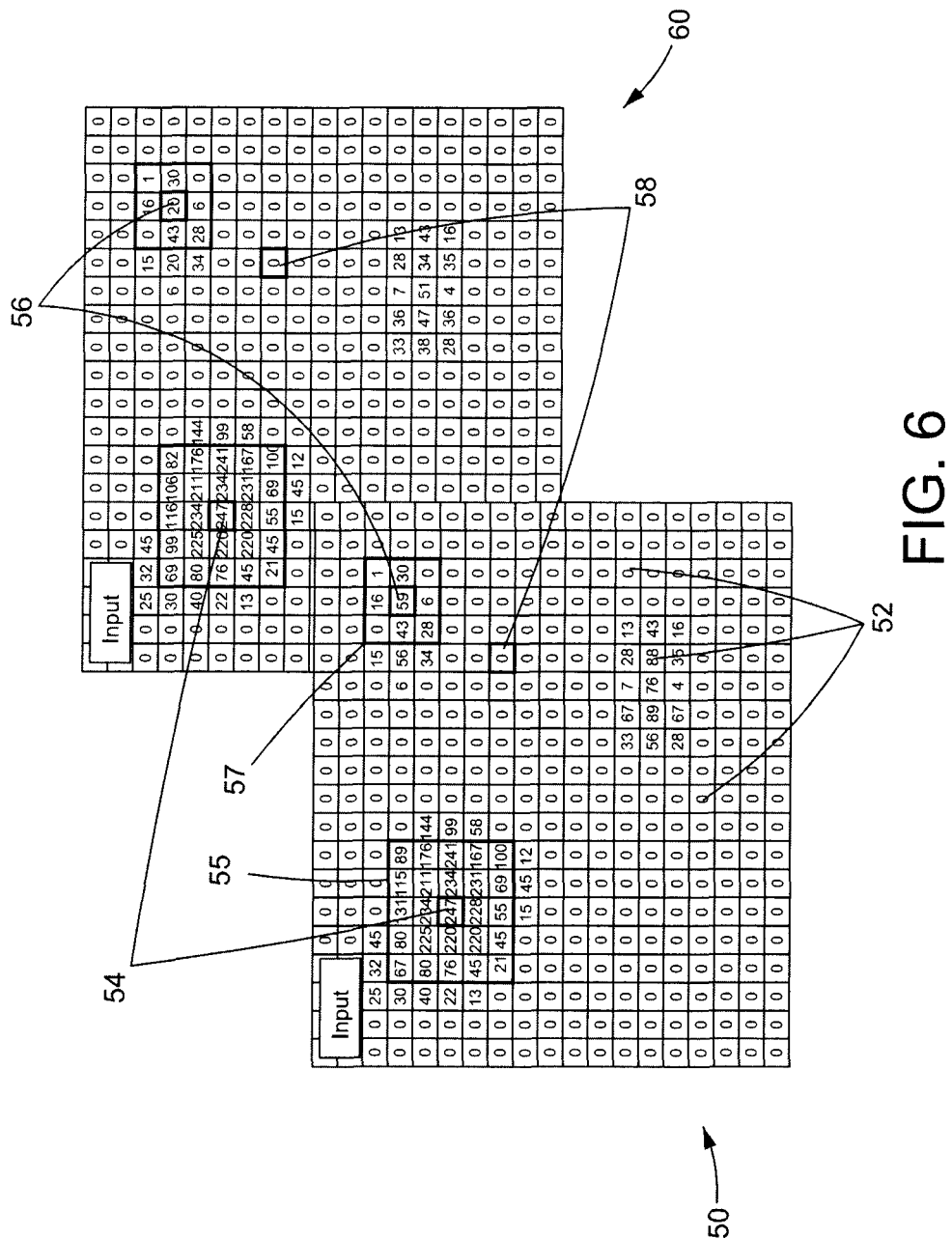
FIG. 6 illustrates the pixel grid shown at FIG. 5 and a pixel grid resulting from adaptive filtering applied to pixel grid shown at FIG. 5.

The handing of these relative height values according to one aspect of the invention is illustrated and described with respect to FIG. 6.

FIG. 6 illustrates the pixel grid shown at FIG. 5 and a pixel grid resulting from adaptive filtering applied to pixel grid shown at FIG. 5. Adaptive filtering may be practiced by producing a filtered pixel value for pixel 54 or 56 by calculating an operator from "a mask," that is, from a group of surrounding pixels 55 which are in the proximity of pixel 54.

As shown at FIG. 6, the filter mask size may be dependent on the pixel height value in the input image. For example, for pixels with lower height value, a smaller mask may be used. For pixels with higher height value, a larger mask may be used. Because pixel 54 has a relatively high height value ("247"), pixel 54 may be given a larger 5×5 pixel mask 55 from which to perform adaptive filtering. Similarly, pixel 56 having a lower height value ("59") may be assigned a smaller 3×3 mask 57, while pixel 58 having a zero height value ("0") may be unfiltered. For simplicity, in this example, the mean of the pixel height values in the mask is used as output statistic computed for output pixel grid 60, though any conventional statistic may be used, including mode, median, variance, or standard of deviation, among others. For example, the mean value of the 25 pixels in mask 55 in pixel grid 50 is about 144 as shown in pixel 54 in pixel grid 60, and the mean value of the 9 pixels in mask 57 in pixel grid 50 is about 20 as shown in pixel 56 in pixel grid 60. The calculations may be rounded, for example, based upon the number of significant digits in the height data. A Gaussian filter may also be used where the filtered value is a weighted average of input mask pixel height values, with the center pixels carrying a heavier weight.

Adaptive filtering may include filtering to remove local maxima that do not represent tree tops. The filtering performed may depend on the type of vegetation (i.e. the type of tree), and the height data may be examined by finding all local maxima in a non-filtered vegetation height raster. If the number of maxima in some vegetation height class exceeds the number of trees in the area, the filter may be applied to reduce the number of maxima. The resulting filtered dataset containing filtered tree height data may be used as input to a tree segmentation algorithm, regardless of the filtering method used. It is also contemplated that the dataset may not be filtered.

Locating trees and tree crowns may include automatic iterative segmentation of vegetation height data, for example, data from a LiDAR dataset. In a manner similar to the process described above for segmentation from rasterized height data, in iterative segmentation, a label map, raster, or pixel array is mapped or overlaid upon the vegetation (or tree) height dataset. One function of this overlaid label map may be to store the information indicating to which "segment," each pixel is assigned. For example, the height dataset may be a raster representing vegetation height value from LiDAR dataset in each pixel as shown in FIG. 5 or filtered output dataset 60 as shown in FIG. 6, and the label map may be similar to the pixel grid 34 of pixels 36 shown in FIG. 3. The label map pixels may coincide with the vegetation height raster pixels 52.

During an initial or first iteration, local maxima (i.e. local vegetation height maxima) may be identified in the dataset, (i.e. in the vegetation height raster) and each maximum may be assigned a label in the label map. These maxima pixels form the "seed points" for the generation of pixel segments. Segments are formed, or grown from seed points, by assigning or labeling pixels adjacent to the labeled maxima pixels as members of the seed segment associated with the labeled maxima, for example, until a segment-specific threshold is met. The segment growing is adaptive, depending upon the values associated with each adjacent pixel. The process may be referred to as "region growing" or "seeded region growing." The growth of pixel segments may be governed by any appropriate algorithm or methodology.

Segment growing or "segmentation," may include comparing the height values of pixels adjacent to the seed points and only adding, or growing the segment, with the pixels having the lowest difference between the seed point value (or the value of pixels that are already members of the segment). The lowest difference or threshold difference value may be determined, for example, depending upon the vegetation being considered. The adjacent pixels having the lowest difference in height value or difference below a threshold are assigned to the segment, and the segment grows. It is also contemplated that no pixel may be assigned to more than one segment.

Identifying the segments may also include adaptive thresholding. Segment growth for each segment may be terminated when a predetermined or dynamically determined condition is met, such as when a threshold number of pixels is met or an adaptive threshold is met. In an adaptive thresholding, each seed point may be attributed a vegetation height (H) in the seed point pixel, using either the unfiltered pixel value 52 or a statistic of the dataset (i.e. LiDAR vegetation returns) inside the pixel. For example, a maximum vegetation height inside the pixel may be used.

Figure 7:
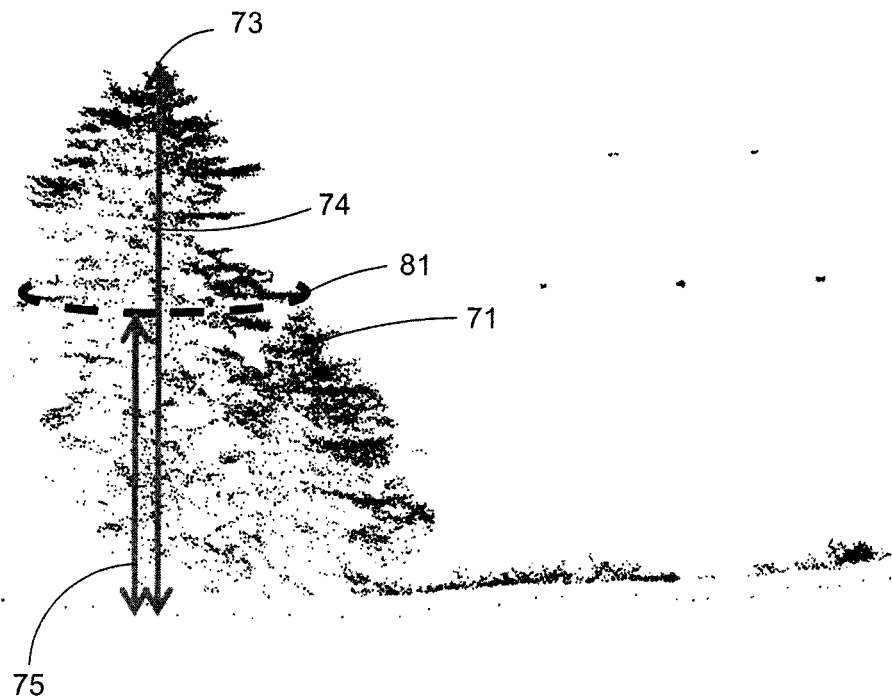
FIG. 7 is a schematic diagram illustrating adaptive segmentation of a dataset.

The adaptive threshold may be set as a function of the height, H, value, for example, in a simple case, as a percentage or "cut ratio" of the H value. The threshold value may be a specific height H1, or a function of height H. FIG. 7 is a side elevation view, showing LiDAR returns of terrain 70 including trees 71 and 72 and illustrating adaptive segmentation of the dataset. Height data may be characterized by a number of ways, such as a graphical display, indicating height data via shading, such as color shading or gray-scale shading. Thus, identifying segments may include, for each identified segment, altering one or more segmentation parameters of the segment based on one or more properties of the seed point from which the segment is started.

Figure 8:
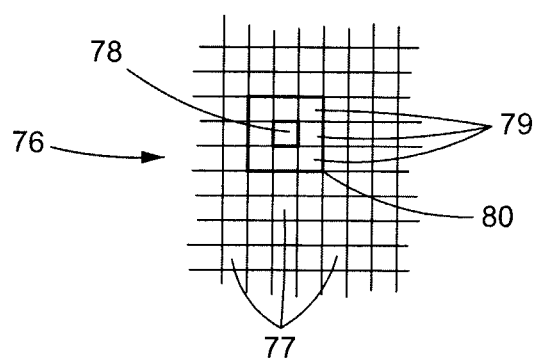
FIG. 8 illustrates a pixel grid having pixels that may be associated with a dataset.

FIG. 8 illustrates a pixel grid or raster having pixels that may be associated with a dataset. As shown in FIG. 7 and FIG. 8, the top 73 of tree 72 may have a height 74. A relative maximum height having a value of height 74 may be assigned to the seed pixel 78 corresponding to tree top 73. The adaptive thresholding segmentation may be assigned a threshold, T, or "cut ratio" height 75. As shown in FIG. 8, pixels 79 may correspond to the vegetation about tree top 73 having pixel data height value greater than the cut ratio height 75 shown in FIG. 7. Accordingly, pixels 79 may be assigned to segment 80 and segment 80 grows from initial seed pixel 78.

After a first or initial segmentation, the process may be repeated for pixels previously excluded from any segment. The repeated process may include the same criteria of the initial iteration, for example, having the same cut ratio, or the criterion or criteria may vary between iterations, for example, the cut ratio may vary. The cut ratio or other criterion, however, may be substantially the same for all iterations. Some pixels in the original vegetation height raster, such as the pixel that covers three 71 shown in FIG. 7, may have a non-zero vegetation height but do not belong to any of the segments after the initial segmentation has ended. After segmentation is performed, second segmentation may be performed in which all pixels previously assigned to a segment are assigned a pixel value of "0." The segmentation process may be repeated to assign previously un-assigned pixels to existing or new segments, such as to define a second set of segments having lower values than the first set of segments. During the second segmentation, no pixels are allowed to overlap with the segments that were already made during the first or initial segmentation. Iterations may be repeated until no pixels with vegetation height above threshold, T, are present in the rasterized vegetation height map.

Automatic tree segmentation may be performed on a dataset (i.e. a LiDAR dataset) using a 3D point cloud segmentation methodology. 3D tree segmentation defines the tree crowns as 3D geometries that can be for example cones or ellipsoids. 3D geometries are used to select the image elements that present the crown surface. Tree health analysis may be performed after image elements are selected and linked to corresponding tree geometries. The health information is attached to the attributes of the 3D geometries that represent the corresponding trees.

Figure 10:
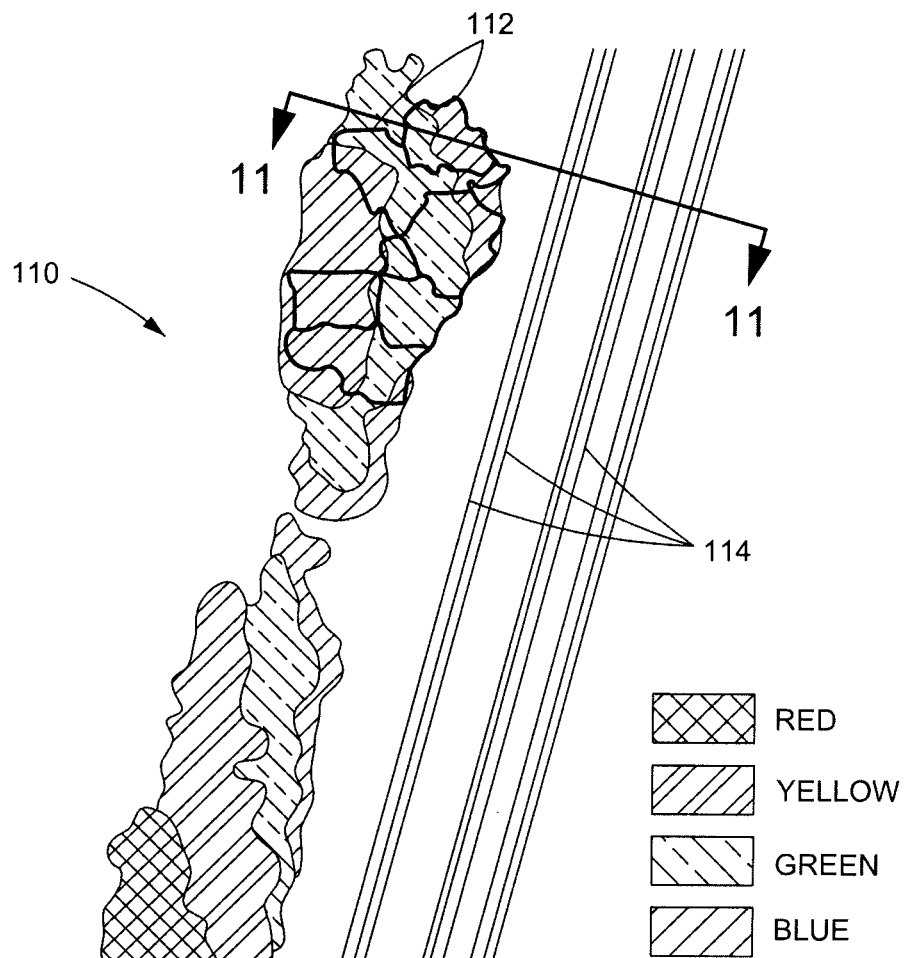
FIG. 10 is a graphical illustration showing the results of an analysis of a dataset using a falling tree analysis.
Figure 11:
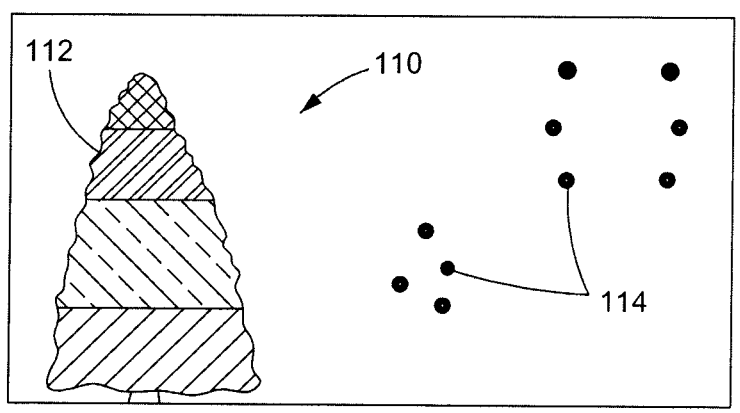
FIG. 11 is a cross-sectional view of the terrain along section lines 11-11 in FIG. 10.

FIG. 10 is a graphical illustration showing the nature of vegetation height information from LiDAR and segmentation results, containing just 7 segments, automatically produced from 110. The polygons 112 shown in FIG. 10 identify the tree crowns that were identified as containing at least one falling tree, that is, a tree having the potential to impact a structure under consideration, such as power lines 114. FIG. 11 is a cross-sectional view of the LiDAR data along section lines 11-11 in FIG. 10 and illustrating the spatial relationship between the trees under polygons 112 and the power lines 114.

Regardless of the segmentation method, when segmentation of the dataset is completed, analysis may be performed on raw LiDAR point cloud dataset, attributing tree characteristics like height and crown density.

Referring to FIG. 1, the method 12 for designating vegetation as potential impact vegetation may include determining, by a processor, a reach distance of the target vegetation, the reach distance comprising a distance from a point on the ground to a point of the target vegetation that is farthest from the point on the ground, as shown at block 16.

Using filter or unfiltered data, a falling tree analysis may be performed to define the reach distance of target vegetation, such as the reach of a tree inside each crown of a tree if the tree were to fall toward the subject structure, such as for example, a power line, communication line, commercial building, or residence. The falling tree analysis may include a number of methods, including the use of LiDAR and the method described in co-owned, co-pending U.S. patent application Ser. No. 12/570,779 filed on Sep. 30, 2009, entitled "METHOD AND SYSTEM FOR LOCATING A STEM OF A TARGET TREE," incorporated herein by reference in its entirety. In a falling tree analysis, each identified target vegetation, tree, or tree crown may be assigned a "falling tree value" that indicates the tree's reach toward the structure or structures under consideration. The reach may be a measure of the distance from the base of the tree to its highest point or the LiDAR return inside the tree crown that is farthest from the tree base point. The falling tree value may be a function of the reach and a distance from the base of the tree to a nearby wire or other structure. Such a function may be, for example, the difference between the reach and the distance to the structure. Or it may be a binary value indicating whether or not the tree will touch the structure if the tree should fall. A "falling tree threshold" may be determined by a processor or defined by the data user, and if a tree crown has a falling tree value greater than the falling tree threshold, the tree is designated a "falling tree."

Figure 9A:
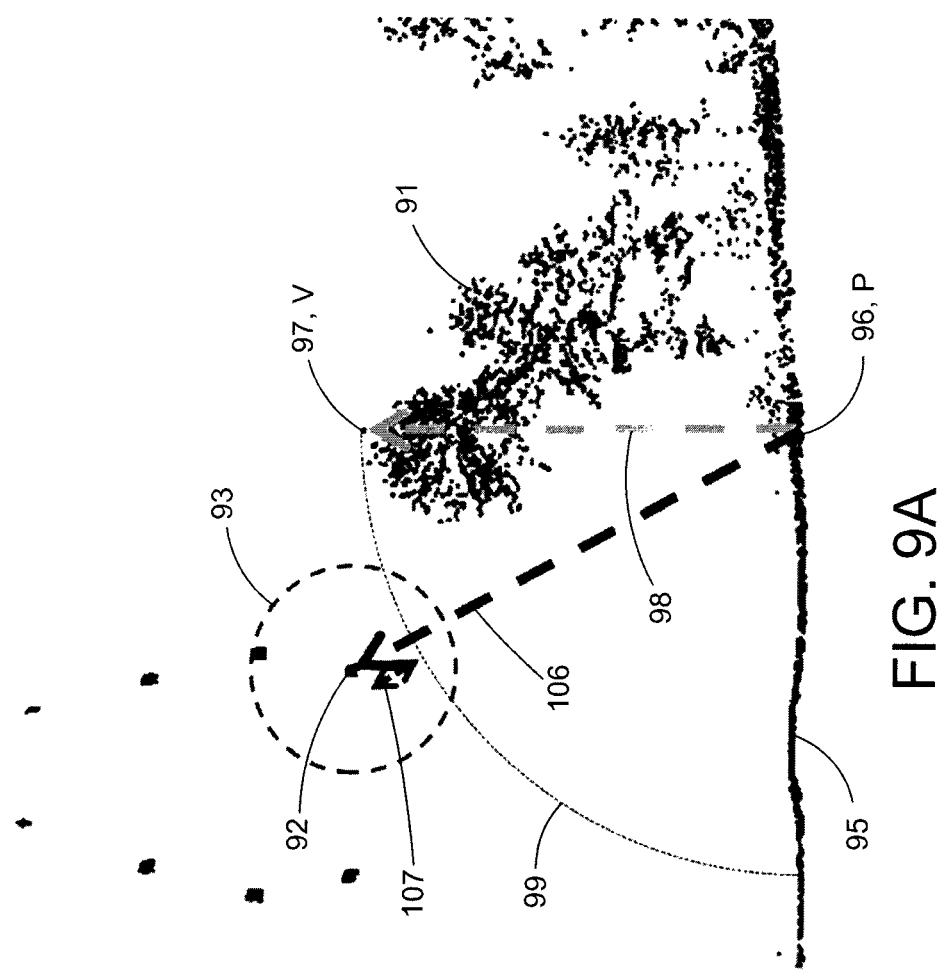
FIG. 9A and FIG. 9B are side elevation views of a LiDAR dataset illustrating different embodiments for identifying falling trees.
Figure 9B:
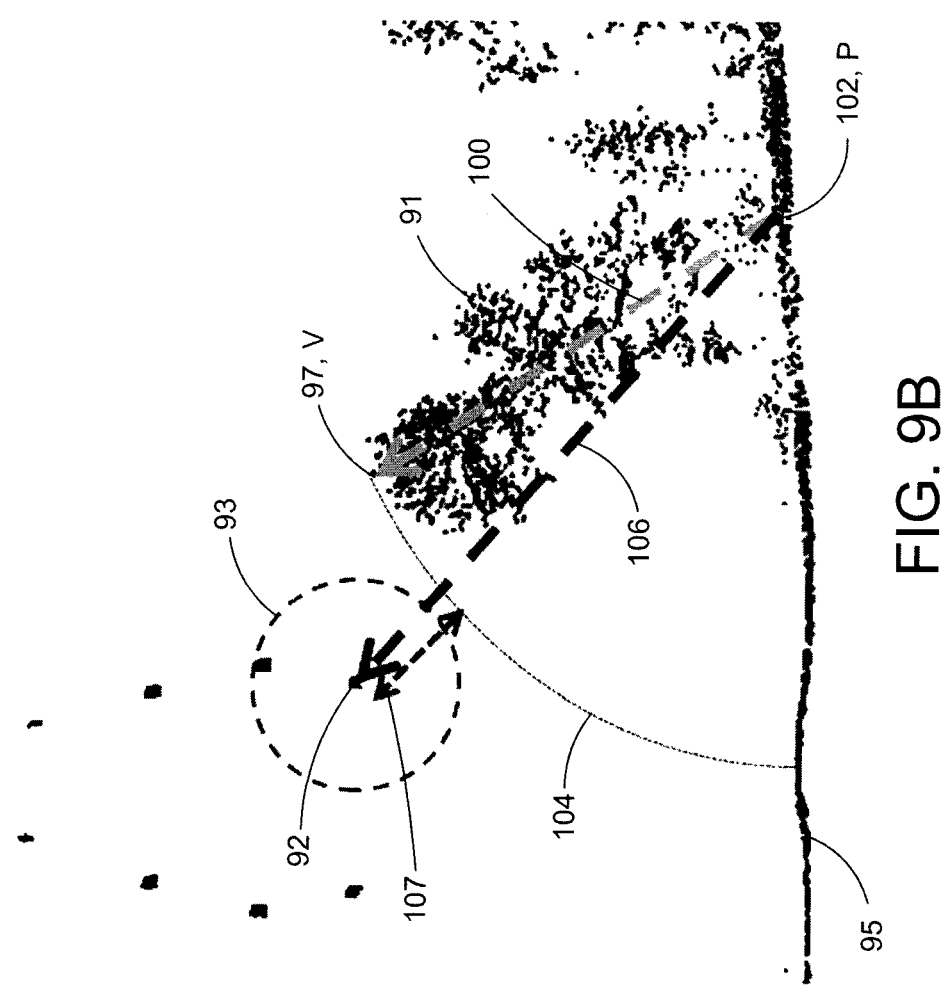

FIG. 9A and FIG. 9B are side elevation views of a LiDAR dataset including tree 91 adjacent to power lines 92 and ground 95 and illustrate different embodiments for identifying falling trees. FIG. 9A also shows a point 96 on the ground 95 substantially directly below the point 97 of the tree 91. As determined from the dataset, tree 91 has a height 98 above ground 95. A point 96 on ground 95, substantially directly below the point 97 (i.e. an X, a Y and a Z coordinate) of the tree 91 is determined from the detected location of the top 97 of tree 91. The position 96 may be projected from the top 97 (point V) of tree 91, to the ground level to determine a pivot point (P). The position of the top 97 of tree 91 may be virtually pivoted mathematically around the ground point 96 (P) to determine the reach distance of tree 91 in the falling path of the tree. The reach of tree 91 may be a vector 98 from point 96 (point P) to point 97 (point V). The virtual pivoting of reach 98 of tree 91 is illustrated by phantom falling path arc 99. In this analysis, the fall-in distance is the smallest distance between the falling path arc 99 and the conductor 92. The reach vector length 98 is compared to the closest distance between the point 96 (P) on the ground and a structure 92. The closest distance between the point 96 (P) on the ground and a structure 92 may be called a base distance. The reach 98 may be extended with the addition of a safety margin, for example, to compensate for arcing distance or any additional reach provided by a tree root bulb.

A stem finder analysis may also be used to define the reach distance of target vegetation, as described for example in co-pending U.S. patent application Ser. No. 12/640,951, which has been included by reference herein. For example, tree crowns may detected from a dataset, for example, a LiDAR dataset, for instance, using one of the tree crown identifying methods described above. A stem finder procedure may then be implemented to locate the stem for the detected crown, a root location of the stem carrying each tree crown by projecting to the ground from the stem location. FIG. 9B shows point 102, which may be defined as a seed point, on the ground 95 where the tree 91 grows out of the ground 95. A point on the ground 102 (X, Y, Z) may be determined from LiDAR cross-section. Using the seed point location as pivot point allows more accurate falling path analysis than pivoting around the point substantially directly under tree crown points. Automatic or manual detection can be used to determine the seed point. As shown in FIG. 9B, the reach distance 100 is a distance from a point 102 on the ground 95 to a point 97 that is farthest from the point 102.

In this analysis option, base distance 106 is the closest distance between the point 102 and a structure, such as conductor 92. The difference between the base distance 106 and reach distance 100 may be defined as the striking distance 107. As shown at FIG. 9B, using the seed point as a pivot point may provide a more accurate striking distance measurement than using the point substantially directly below the point 97 of the tree 91. A negative strike distance may indicate that the tree can reach over the structure.

Referring to FIG. 1, the method 12 for designating vegetation as potential impact vegetation may include comparing, by the processor, the reach distance of the target vegetation with a closest distance, or base distance, between the point on the ground and a structure to produce a compared reach distance value, as shown at block 18. The processor may produce a compared reach distance value. FIG. 9A and FIG. 9B show a safety buffer zone 93 about the structure 92 under consideration, which may be used to determine a fall-in distance threshold value. A safety buffer zone may be defined as an area or volume extending a maximum predetermined distance or radius away from the structure where any impingement by a falling tree 91 would be a concern. For example, if a tree fell within the safety buffer zone of electrical power lines, it may create an arc even though the tree would not physically contact the power lines.

Using the falling tree analysis to determine the fall-in distance of target vegetation, the fall-in distance may be compared to a fall-in distance threshold such as the power line safety buffer zone 93. If the fall-in distance corresponding to arc line 99 is longer than the closest distance that intersects the boundary of buffer zone 93, the tree may be designated a "falling tree." For example, as shown in FIG. 9A, the arc line 99 of reach 98 intersects the safety buffer zone 93 of power lines 92. Accordingly, tree 91 may be designated a "falling tree," having a potential to impact a structure. As another example, if the reach distance of a tree is greater than or equal to the base distance minus the fall-in threshold, the tree may be designated as a falling tree having a potential to impact a structure.

Using the Stem Finder analysis, reach arc 104 may be compared with the position of buffer zone 93 to determine whether tree 91 is a "falling tree". That is, reach arc 104 may be compared with the position of buffer zone 93 to determine whether tree 91 is vegetation having a potential to impact a structure. For example, as shown in FIG. 9B, reach arc 104 may not intersect buffer zone 93. Accordingly, using Stem Finder analysis, tree 91 may not be designated a "falling tree," having a potential to impact a structure.

Referring to FIG. 1, the method for designating vegetation as potential impact vegetation may include determining a health indicator value for the target vegetation, as shown at block 20. A health indicator value for the target vegetation may be determined, by a processor. The health indicator value for the target vegetation may also include calculating a color difference between an analyzed pixel and a determined reference color.

Figure 12:
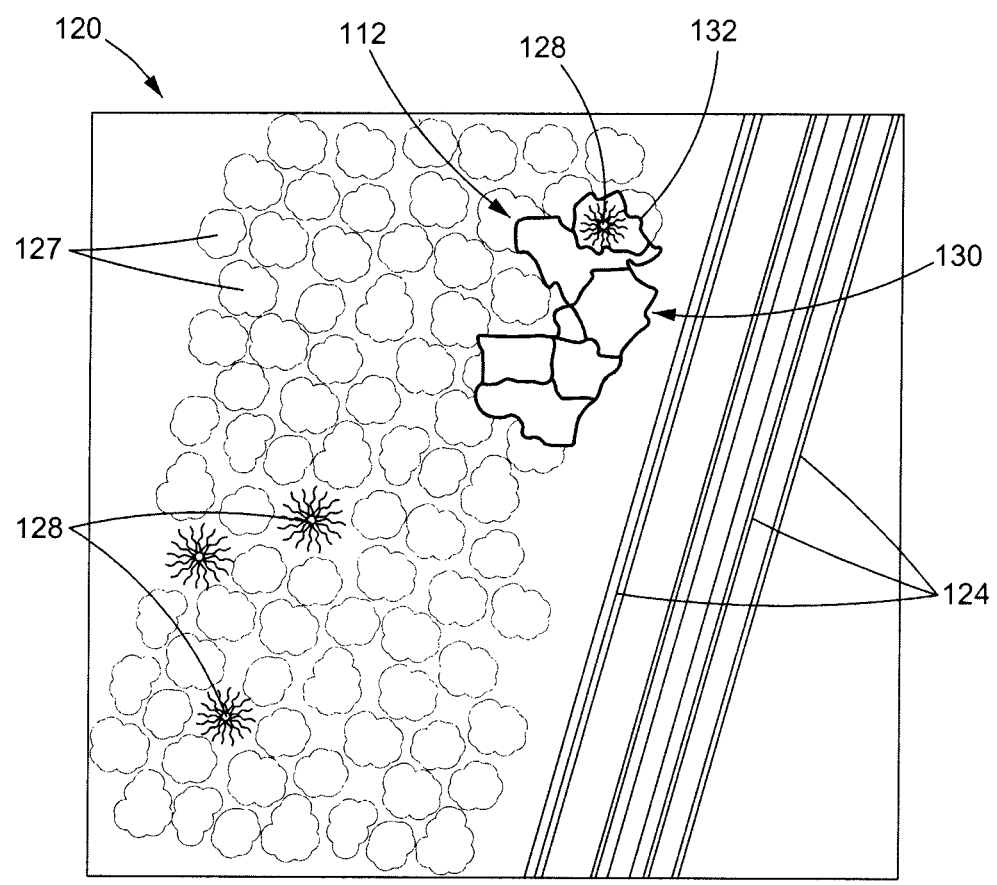
FIG. 12 is an image that has been overlaid under the crown polygons shown in FIG. 10.

The relative or absolute health of a tree is evaluated from field observation and/or image data, for example, from aerial image data associated with the tree crown data and the falling tree data defined above. Pixel-level health indicators for vegetation (i.e. trees) inside each pixel may be defined by analyzing and/or classifying the pixels of image that fall inside the crown, for example, as shown in FIG. 12. Some of the health indicators may have high values for healthy trees, for example, a high normalized differentiated vegetation index (NDVI). Other indicators may have low values for healthy trees (for example, amount of branch wood or deadwood color that is visible in image). The tree crowns that are identified to include falling trees may be overlaid on a red-green-blue (RGB), color-infrared, multi-band or spectrometer image. The image may be taken from aerial vessel and additionally, may be orthorectified. RGB, color-infrared, multi-band or spectrometer images are called "color images" herein.

An indication of the health of trees under consideration is acquired by analyzing the reflection of light, most notably, sun light, from trees and vegetation, in particular, the reflection of radiation (typically, visible light) from trees within the crowns or crown polygon identified above. The reflected radiation may be acquired with one or more radiation sensors, for example, sensors adapted to detect radiation in a plurality of different bandwidths. The detected radiation may include electromagnetic radiation in the visible bandwidth, the ultraviolet bandwidth, and/or the near infrared bandwidth. The bandwidth may be detected and recorded. The bandwidth may also be determined because stress in a tree may manifest by radiation change in the red edge area of infrared light. Red edge is a bandwidth area where the reflectance from living vegetation changes rapidly, causing different vegetation types and conditions have differing signatures in red edge area.

The vegetation or tree location dataset, such as the images detected by the LiDAR, may be mapped or overlaid upon the reflected light image dataset. Because the overlaid reflection dataset is associated with the created polygons discussed above, the reflection image data may be orthorectified. "Orthorectification" may be defined as rectifying an image to a map projection so that each feature in the image is located in its true location in the map projection used. Orthorectification may uniform the image scale as well. The reflection image data may be overlaid on the dataset in such a manner that the image radiation values, such as color values, are assigned to the proper areas identified above. For example, the image radiation values may be assigned to those areas identified by polygons or segments. The radiation imagery may be sensed, detected, or collected from a high altitude, for example, from at least 800 meters above the trees under examination to minimize the distortion of the geometry and/or resolution of the radiation images. For example, the height of the trees being examined may cause distortion to the orthoimagery when the orthoimage production process employs a digital ground elevation model as a surface to project the image pixel values.

The radiation imagery and tree height/location imagery data, for example, LiDAR data, may be substantially simultaneously collected to minimize or prevent mapping or overlay errors. For example, the data may be simultaneously collected form a height of at least 500 feet, or at least 700 feet, an elevation that has been shown to produce satisfactory results. Image quality may be enhanced, however, if the imagery is collected, for example, simultaneously collected, from an even higher altitude, while still providing the same ground resolution.

As noted above, the radiation sensors may be adapted to detect visible light, infrared (IR) light, and ultraviolet (UV) light. For example, the imaging sensors may collect IR, red (R), green (G), and blue (B) visible bands at the same time. The collected data may colored red-green-blue (RGB) image data or color infrared (CIR) image data, correspondingly, and the data can be used with the same principles as RGB or CIR data.

The tree health data may be collected using RGB imaging or manual input. RGB imagery is one of basic remote sensing media that can carry health-related information for vegetation. For example, health indicative features of trees that may be identified with RGB imagery, another automatic procedure or by the human eye include dead branches, grayness/brownness of canopy, less intensive shade of green in the early season imagery, and early fall foliage.

The dead branches on the top of a tree may indicate dying, compromised health, or a decaying condition of the whole tree. The top of tree is especially indicative in this sense, and is visible from the vantage point aerial orthoimagery is collected. Dead branches may appear grey, blue or brown in color, which is well distinguishable from the green color of healthy leaves.

Stressed trees may show brownness or grayness of the canopy during growth season because the ground, branches, and darker shaded areas of a canopy may be more visible through the lower density leaf cover. Stressed trees may also show brownness or grayness because some of the leaves turn grey or brown. In conifers, old, dead needles typically display brown colors, and the smaller amounts of living healthy needles may cause the crown to appear browner, and less intense green. These features may indicate leaf loss and can be used to indicate trees with lower vigor.

Trees with compromised health tend to sprout leaves later in the season. If the imagery is collected early in the growth season, the trees with compromised health show more branches or ground through the canopy than the trees with good vigor. Stressed trees also tend to achieve fall foliage earlier than vigorous ones. Especially if a certain species is a common object of interest, fall foliage may be used to produce a health indicator. The imaging is performed during the fall foliage in such a time when the low vigor trees have turned colors more than the vigorous ones. Some embodiments may be suitable for a small marginal group of trees, with a local knowledge of the fall foliage pattern.

FIG. 12 is an image that has been overlaid under the crown polygons shown in FIG. 10. The tree crown area polygons 112 may be overlaid on an image 120, which may be a color image consisting of visible red (580-660 nanometer [nm] wavelength), visible green (480-600 nm wavelength), and visible blue (400-450 nm wavelength) radiation bands. The power or utility line conductors 124 may be visible in the image 120 in FIG. 12. In a color image, dead branches 128 may show gray color. Trees that contain dead branches 128 may be in compromised health. The arrow 130 in FIG. 12 identifies a polygon 132 that includes a tree having dead branches 128 indicating the tree may be a dead tree. In some embodiments, other spectral bands yield different kinds of health indicators.

Color infrared imagery (CIR) may be used for vegetation type and quality assessment analysis. In CIR imagery, the reflectance of trees in the red and the infrared bandwidths varies strongly based on the chlorophyll content of the vegetation. Chlorophyll content of trees, in turn, is typically related to the vigor of the tree. Different species may have different natural chlorophyll contents and different species may vary in their CIR color response. When a tree shows very low chlorophyll content during leaf-on growth season, however, the health of the tree may be compromised.

Tree health using CIR imagery may be indicated using normalized differentiated vegetation index (NDVI). NDVI is a graphical indicator that can be used to analyze remote sensing measurements. For example, a high NDVI is a feature of vigorous vegetation; a low NDVI can be caused by a tree health issue.

Tree health using CIR imagery may also be indicated using band ratios between infrared (IR) and visible color bands. A low response in the IR band indicates low health. IR may, however, be sensitive to illumination conditions in the target area. The band ratios may be used to normalize the IR band values for common illumination conditions to provide a more robust health indication. Band ratio is a pixel value calculated as a function of two or several pixel values on different bands in the same location. The most common band ratio is produced by dividing one band value with another, for example:

$V = IR/R$, where IR=pixel value on infrared band and $R$=pixel value on red band.

Special caution should be used to avoid non-solvable situations when the divisor goes to 0. Additionally, values tend to be noise-prone when the divisor is close to 0. A rough solution is to write the band ration to a form that prevents the divider from going to 0 (with all positive or 0 pixel values), still providing approximately the same output values as the first equation, such as:

$V = IR/(R+1)$, where IR=pixel value on infrared band and $R$=pixel value on red band Another common band ratio is band difference, for example:

$V = (IR - R + R_{max})/2$, where

IR=pixel value on infrared band, R=pixel value on red band and $R_{max}$=the maximum pixel value on red band.

This yields pixel values that scale to the same bounds as the original values. Band ratios can be used as health indicator values as such, if they correlate with field reference on health indicators.

Information about the health of a tree may also be collected with a spectrometer. For example, spectrometric imaging may be implemented when the resolution of the spectrometer is adequate and a sufficient number of pixels within each crown may be detected. In this text, "spectrometer" is used to indicate any sensor that collects color reflection data on more than four channels (bandwidths). The number of available channels may be utilized in a spectrometer by recording narrow range of bandwidths in each channel. Thus, a more detailed picture of the spectrum reflected in each pixel may be provided. For example, in remote sensing, a "red edge" is the variation of the reflectance between different vegetation on the red and infrared area of bandwidths. Some species, naturally, absorb wider area of bandwidths than others. Stress in vegetation is also visible in the red edge area of the radiation. Adapted to the local conditions, band ratios in the red edge area can be used to determine stress in tree vegetation. Spectrometer data may also be used by taking ratios or differences of bands, or of different band combinations, to normalize the common illumination differences in each pixel.

Figure 13:
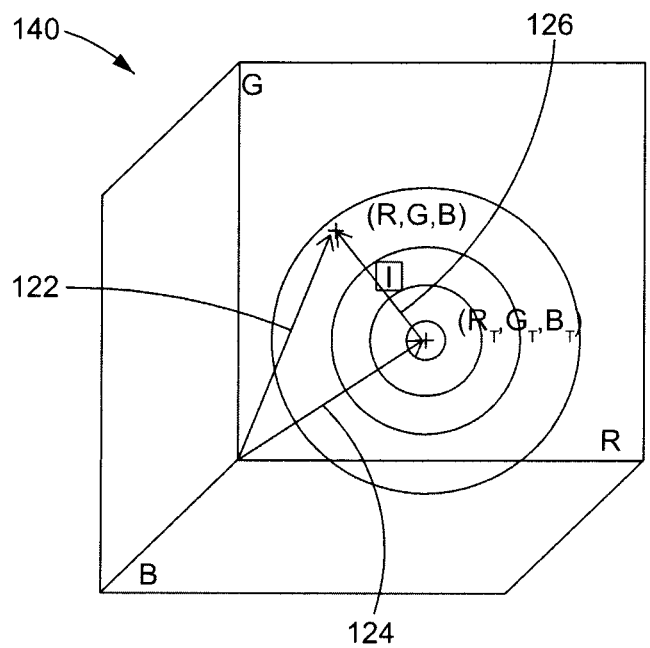
FIG. 13 is a schematic illustration of a three-dimensional color space.

After the detected radiation bands, for example, IR or visible color bands, are detected as discussed above, the detected radiation is examined and a health indicator value is determined. A health indicator value for each pixel may be determined. A health indicator value may be determined by a distance in a color space for the detected radiation. For example, FIG. 13 is a schematic illustration of a three-dimensional color space 140, in particular, a red (R)-green (G)-blue (B) color space. Other color spaces may be used. The orthogonal axes of color space 120 in FIG. 13 are identified accordingly as bands, in dimensions of wavelength, for example, in nanometers. The values on the axis are the intensity of the given pixel on each band. On spectrometer data, each band can be specifically selected to provide best health indicator, and some bands can be combinations of several bands. The color space may include any number of dimensions. Each pixel in the dataset, such as the dataset 120 shown in FIG. 12, is associated with the one or more radiation bands (for example, colors) of the detected radiation. The optimal color space and dimensions may depend upon the characteristics of the trees being imaged, the type of image data detected, and the desired output. The optimal color space and dimensions may be determined via field observation, analysis, and/or testing.

Though the 3-dimensionl space 140 shown is an RGB space, any space, such as a hue, saturation, and lightness (HSL) color space may be used. Each band R, G or B can represent any raster (for example, pixel) values, for example, IR, R, and/or G bands. In the example shown in FIG. 13, a pixel in the radiation dataset is assigned coordinates (R, G, B) in the RGB color space, for example, as defined by the vector 122. The vector 122 may be compared to a vector defining the coordinates of a target color in the color space. For example, in one aspect, a target color may be associated with the color vector of a known dead branch, or a color of dead branch readily recognizable from the detected radiation, for example, brown or gray. The target branch color may have the coordinates $(R_T, B_T, G_T)$ in the RGB color space 140 of FIG. 13, and may be defined by the vector 124. The sample vector 122 and target vector 124 may be compared to define a relationship between the sample color of vector 122 and the target (or dead branch) color of vector 124. Any means of comparing the two vectors may be used.

In one aspect, vector 122 and vector 124, may be compared by determining a distance vector 126 having a length l in FIG. 13. For example, the distance l can be computed from the coordinates of vector 122 and the coordinates of vector 124 by the expression shown in Equation 1.

$$l = \sqrt{(R-R_T)^2 + (G-G_T)^2 + (B-B_T)^2}$$  Equation 1

The distance or length l of vector 126 may be used to define the relationship of each pixel to the target "dead branch" color. The length l may be assigned as a value, for example, a new value, associated with each pixel, for example, stored in a temporary computational raster or pixel grid "RastT." The color distance/may also be transformed to, for example, a grayscale color value using a transformation formula. In one aspect, a raster or pixel grid "RastS," similar to raster RastT, may be defined by scaling or transforming the pixel values of raster RastT, for example, to a meaningful scale. For example, the value of lengths l in raster RastT may be scaled by a linear transformation from l values. A transformation resulting in a raster of values ranging from a value corresponding to a maximum value for l to a "0" value, or a transformation resulting in a raster of values ranging a maximum value to a minimum value may be used. The resulting scaled value, D, may yield a highest pixel value in the range for pixels when l has an un-scaled value of "0", and a "0" value may be assigned to pixels with higher scaled D value than the set maximum threshold. Alternatively, other kinds of transformations may be used, for example, a Gaussian transformation can be used to relate the un-scaled values in raster RastT and scaled values in raster RastS. Accordingly, the raster RastS may define a measure of pixel value similarity between the target color and each pixel in the raster.

Figure 14:
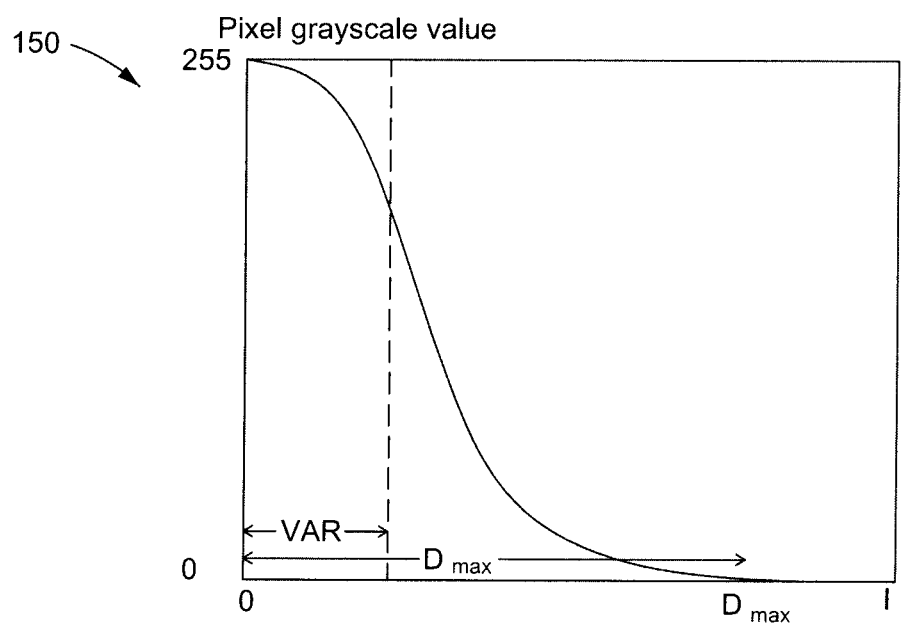
FIG. 14 illustrates a Gaussian transformation function that may be used to transform data values.

FIG. 14 illustrates one transformation 150 that may be used. One transformation formula shape is of Gaussian function, for example, a Gaussian function defined by a variance value VAR, or a Gaussian function defined by a value of l that yields a grayscale value of 0. As shown in FIG. 14, the abscissa in the transformation curve is the color length value l, for example, obtained from raster RastT, and the ordinate is the transformed grayscale value, for example, the value stored in raster RastS. As shown in FIG. 14, in this aspect, any value of l greater than the predetermined value $D_{max}$ is assigned the grayscale value "0." In this example shown in FIG. 14, each pixel is assigned an integer grayscale value between 0 and 255.

Figure 15:
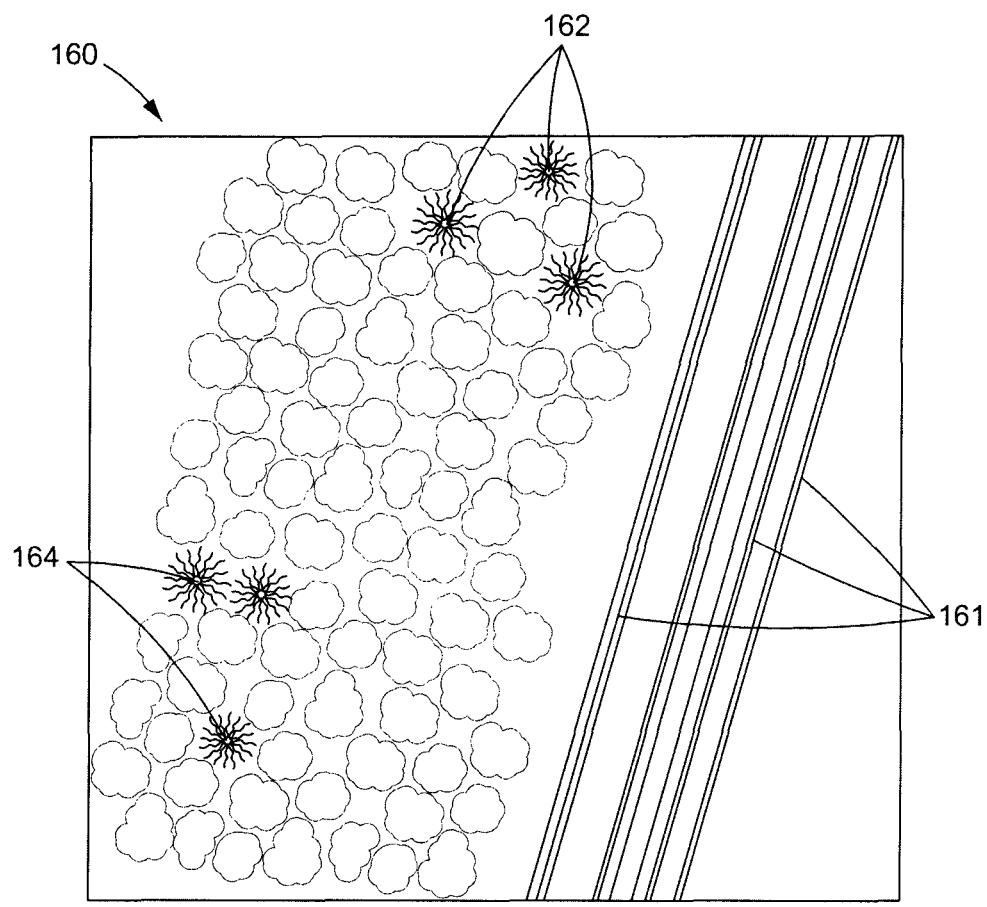
FIG. 15 a schematic illustration of the results of a tree health analysis of the image dataset shown in FIG. 12.

FIG. 15 illustrates the results of the image data processing illustrated in FIG. 13 and FIG. 14. FIG. 15 is a schematic illustration 160 of the results of a tree health analysis of the image dataset shown in FIG. 12 including power lines 161. The trees 162 that pose a falling tree threat may be considered in the health analysis summarized in FIG. 15. As described above, the tree health analysis may utilize image-derived features that indicate health condition of the tree canopy. In this example of image classification analysis, the pixels that represent dead trees 162, 164 are identified or classified and may be shown in any convenient indicia, such as a color on tree tops of the image. To eliminate fallen or low trees from the analysis, vegetation height data, for example, derived from LiDAR, may be mapped or overlaid on top of the classified pixels, and only pixels that are located under tall vegetation may be considered in this analysis.

As a result, a heath indicator value is associated or assigned to at least some of the pixels in a raster or pixel grid, for example, raster RastT and/or RastS, of a dataset. Substantially all of the pixels in a raster of a dataset may be assigned a health indicator value.

The health indicator values of the pixels in a segment or polygon may also be used to define a collective indicator of the health of the vegetation or trees in a segment. One or more statistics related to the health indicator values inside each crown (i.e. inside each segment polygon) may be computed and assigned to as an attribute of a crown, such as to an attribute table of the crown, as shown in FIG. 15. These one or more statistics may contain, for example, mean value, percentile value or percentage of polygon covered by values higher than given threshold. The health indicator value may describe a statistic that is calculated and attributed to a crown or crown segment from pixel-level health indicators.

The health indicator value may correlate with the health condition of the tree vegetation inside the crown. For example, a statistic of the collective health values of the pixels in the segment may be determined. The statistic may be an average health indicator value of the segment, for example, a mean, a mode, and/or a median of the health indicator values within the segment. The number or percentage of pixels in the segment exceeding a threshold number or percentage health indicator value, for example, a predetermined health indicator value, may be used to characterize a segment. Accordingly, the one or more statistics of the health indicator value are assigned or attributed to the segment, for example, to the polygon associated with the segment of pixels.

Referring to FIG. 1, the method may include comparing the health indicator value of the target vegetation with a health indicator threshold value, as shown at block 22. A processor may compare the health indicator value of the target vegetation with the health indicator threshold value. One or more threshold values may be predetermined for one or more of the health indicator statistics. For example, when one or more of threshold values are exceeded, the one or more trees associated with the crown or segment polygon, can be designed in compromised health. For some health indicator statistic, combined values may be used as a basis for a threshold.

Figure 16:
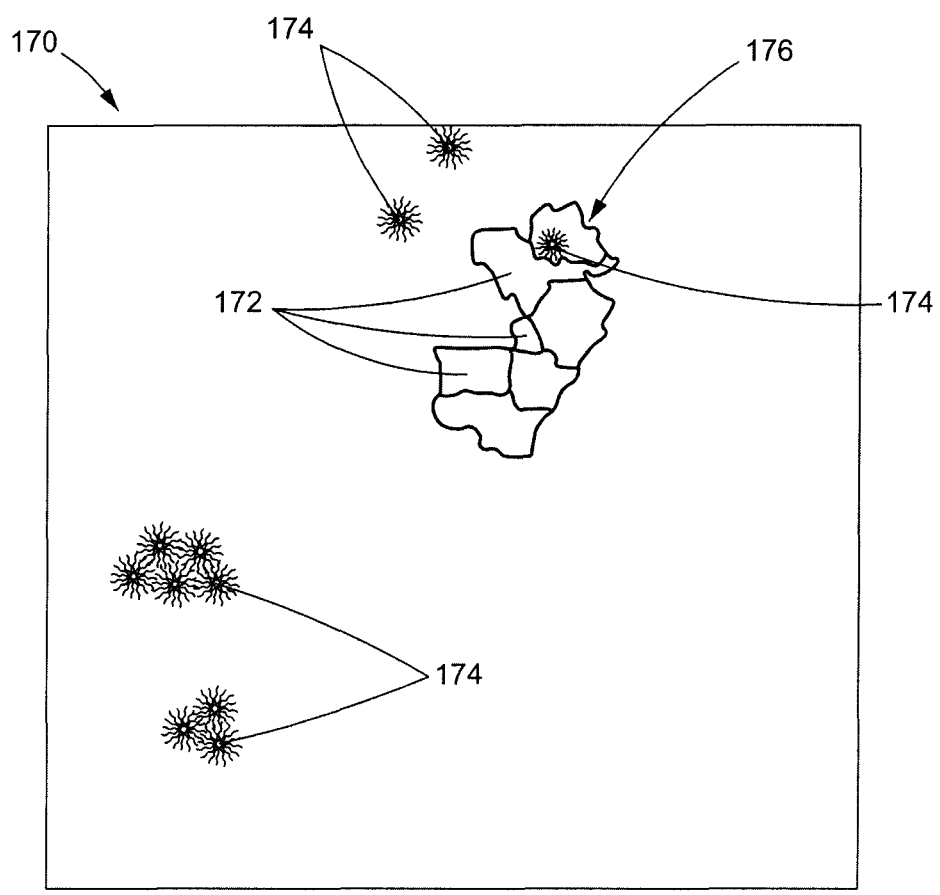
FIG. 16 is schematic illustration of falling tree crowns.

FIG. 16 is schematic illustration 170 of an exemplary display of falling tree crowns. As shown in FIG. 16, segment polygons 172 can be mapped or overlaid onto an interpreted dataset image, for example, where black color indicates "dead wood." In this example, the percentage of each segment polygon 172 having dead wood pixels is considered as the health indicator value. Pixels 174 may be identified of the binary (that is, black and white) raster identify dead branches, and white pixels can contain anything else. Dead branch pixels 174 identify dead wood located in a pixel where the vegetation height is over 30 feet above ground. Correspondingly, the health indicator value may be computed as a percentage of the segment polygon 172 having dead branch pixels 174. The arrow 176 in FIG. 16 identifies a segment polygon with relatively high percentage of dead branch pixels, which may indicate a tree having a potential to impact a structure.

The identified hazard trees may be subjected to a manual quality control, where human interpretation is applied to analyze the remote sensing material. In this embodiment, human intervention can completely replace the production of health indicator values. While the method of identifying the falling trees and displaying their geometries over the health analysis image material may be automatic, the determination of the health indicator may be determined manually. The application can automatically identify the fall-in trees and zoom to each geometry of interest and allow a user interface to determine the health condition, accepting the user's input.

A combination of automatic and manual interpretation may also be utilized where automatic analysis of health indicators is used to sort out majority of cases, still using low health indicator values to sort relatively large amount of trees for human interpretation. In the human interpretation phase, these preselected trees are exposed for human interpretation. This method may be efficient, for example sorting 10% of all fall-in trees for human interpretation, while the total number of hazard trees out of all fall-in trees may be for example 3%.

A sample of the tree crowns may be observed and analyzed in the field, or by an image analysis, to define the health condition of the sample trees. For example, in one aspect, a sample of the tree crowns is identified and analyzed in the field, or by an image analysis, to define the health condition of the tree vegetation inside the crowns. The health condition value may be assigned to each crown. The "health condition" may refer to a field-evaluated health of the tree crown. Using the health conditions identified in the field, a sample dataset as independent variables and health condition as a dependent variable can be determined. A model may be provided and applied to all crown areas, for example, to predict the health condition of each crown. A threshold value can be defined for the health condition, as described above, and the tree or crown can be designated "in compromised health" if the health condition exceeds or is below the acceptable health condition threshold. The acceptable health condition threshold value may be dependent on local conditions and may be defined by the data user.

Sampling and field reference data may be used to reference or corroborate the health information created. For example, a systematic sample of health indicators of suspected unhealthy trees can be made. A sampling procedure may include: defining the range of all health indicator values; dividing the range to evenly distributed classes, classifying all crown areas to the classes, forming sampling classes, where each class is a unique combination of class values; identifying a number of sampling classes; dividing the desired sample size by number of sampling classes to get the number of samples to be drawn from each class; and randomly drawing the right number of samples from each sampling class.

Structure maintenance, such as, in overhead utility transmission and distribution may also be used for utilizing the analysis results. For example, each sampled tree crown area may be located in the field and the health of the tree crown inside the crown area may be determined. The following classification may be added to each tree crown polygon segment as an attribute, may be used to describe the health condition of the tree:

| Class | Description of class |
|---|---|
| 0 | Crown area contains a dead tree |
| 1 | Crown area contains a tree in significantly compromised health |
| 2 | Crown area contains a tree in compromised health |
| 3 | Crown area contains a tree in slightly compromised health |
| 4 | Crown area contains a tree that shows some stress |
| 5 | Tree vegetation inside the crown area is completely healthy |

A model may be provided within the sample dataset and applied to all crown areas, for example, to predict the health condition of each crown. The health indicators provided may be used as independent variables and the field-interpreted tree health class may be used as dependent variables. For example, a model may be built to predict the health class value as a function of health indicators. A threshold value for the tree health condition that is identified as a "hazard tree" or "falling tree" may be determined by operator or data user. Additionally, a "falling tree" value threshold may also be determined by the user.

The target vegetation may be designated as having a potential to impact the structure, as shown at block 24. The target vegetation may be designated as having a potential to impact the structure based on the compared reach distance value and the comparison of the health indicator to the health indicator threshold. The target vegetation may also be designated as having a potential to impact the structure if the reach distance is greater than or equal to the base distance. The target vegetation may also be designated as having a potential to impact the structure if the difference between the base distance and the reach distance is greater than or equal to a threshold distance. The threshold distance is equal to a predetermined distance extending from the structure. The predetermined distance extending from the structure may also include a value associated with a safety buffer zone.

Each segment polygon may be analyzed, and, when the health indicator value is above the health indicator threshold and the falling tree value is above falling tree value threshold, the segment polygon may be assigned an attribute of "hazard tree." In addition to the hazard tree analysis and identification method described herein, the inventors contemplate various methods for utilizing the analysis results in structure management and maintenance, for example, for overhead utility transmission and distribution power line management and maintenance, for overhead communication or phone line management and maintenance, for railroad management and maintenance, for road/highway management and maintenance, and in the management and maintenance of structures.

Figure 17:
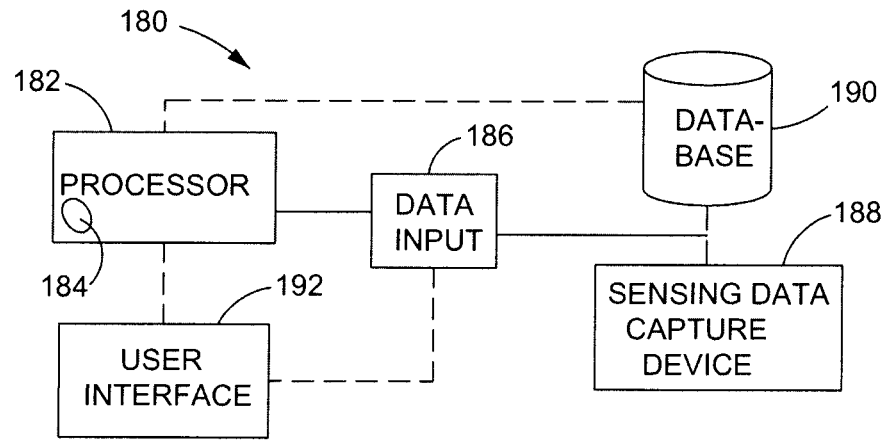
FIG. 17 is a schematic illustration of a system for locating a tree having the potential to impact a structure.

FIG. 17 is a schematic illustration of a system 180 for designating vegetation, such as trees having the potential to impact a structure. System 180 includes a processor 182, a tangible computer readable computer-readable storage medium 184, a data input 186, a data capture device 188, a data base 190 and a user interface 192. Although the components of system 180 are shown separately, one or more components may be included in a single device. For example, system 180 may include a computing device that includes processor 182, tangible, computer-readable storage medium 184 and program instructions that implement a method of designating vegetation as potential impact vegetation. In some embodiments, storage medium 184 is configured to store the instructions. Processor 182 may also receive instructions directly by the user interface 192. The instructions may instruct the processor 182 identify data relating to target vegetation from a dataset, the reach distance comprising a distance from a point on the ground to a point of the target vegetation that is farthest from the point on the ground; compare the reach distance of the target vegetation with a closest distance between the point on the ground and a structure to produce a compared reach distance value; determine a health indicator value for the target vegetation; compare the health indicator value of the target vegetation with a health indicator value threshold; and designate the target vegetation as having a potential to impact the structure based on the compared reach distance value and the comparison of the health indicator to the health indicator threshold. For example, the target vegetation may also be designated as having a potential to impact the structure when the reach distance is greater than or equal to the reach distance threshold and when the health indicator deviates from the health indicator threshold, as shown at block 24 of FIG. 1.

The instructions may also instruct the processor 182 to select an action from a group comprising: notifying a user of a possible impact upon the structure by the target vegetation; displaying one or more possible points of impact upon the structure by the target vegetation; attributing a tree database with an impact table record that describes an impact between the target vegetation and the structure; displaying an indication that the target vegetation on a map requires service due to possible impact upon the structure; and generating a work order to have the potential impact upon the structure mitigated.

Some of the instructions may be implemented by a processor or performed manually. For example, a health indicator value may be determined manually. Further, the health indicator value may also be manually compared with a health indicator threshold value.

The tangible computer readable storage medium 184 may include a compact disk (CD), a magnetic tape, an optical drive, a DVD, a hard drive, a flash drive, a memory card, a memory chip, or any other tangible computer readable storage medium. The processor 182 may alternatively or additionally include a laptop or desktop computer, a microprocessor, an application-specific integrated circuit (ASIC), digital components, analog components, or any combination and/or plurality thereof. The processor 182 may be a stand-alone unit, or it may be a distributed set of devices.

Data input device 186 may be coupled to the processor 182 and configured to provide the processor 182 with at least one sensing dataset, for example, a LiDAR dataset. A sensing data capture device 188 may optionally be coupled to the data input device b to enable the live capture of a sensing dataset. Examples of sensing data capture devices 188 include, but are not limited to, full waveform, multiple-return or first and last pulse-recording LiDAR sensors. Similarly, a database 190 may optionally be coupled to the data input 186 and be adapted to provide one or more previously captured sensing datasets to the processor 182. Database 190 may be as simple as a memory device holding raw data or formatted files, or database 190 may be a complex relational database. Depending on the embodiment, none, one, or multiple databases 190 and/or sensing data capture devices 188 may be coupled to the data input device 186. The sensing data capture device 188 may be coupled to the data input device 186 by a wired connection, an optical connection, or by a wireless connection. Suitable examples of wireless connections may include, but are not limited to, RF connections using an 802.11x protocol or Bluetooth protocol. The processor 182 may be coupled to the database 190 for storing results or accessing data by bypassing the data input device 186.

As shown in FIG. 17, system 180 may also include a user interface 192 which may be coupled to either the processor 182 and/or the data input 186. The user interface 192 may be configured to display a dataset having sensed data, at least one slice from the dataset, a tree crown location (i.e. including a tree stem location and/or a tree height projection), and/or any of the other features discussed above. The user interface 192 may be configured to receive user instructions from a user. The user interface 192 may also be configured to allow a user to select a dataset having sensed data from a database 190 coupled to the data input 186, or to start and stop collecting data from a sensing data capture device 188 which may be coupled to the data input device 186. The user interface may include a touch-sensitive input component that is integrated with a display, such as a capacitive, resistive or other type of touch screen. Alternatively, the touch-sensitive component may be an item of hardware that is separate from the display, touch as a touch pad or trackpad, such as a keyboard and a mouse.

Figure 18:
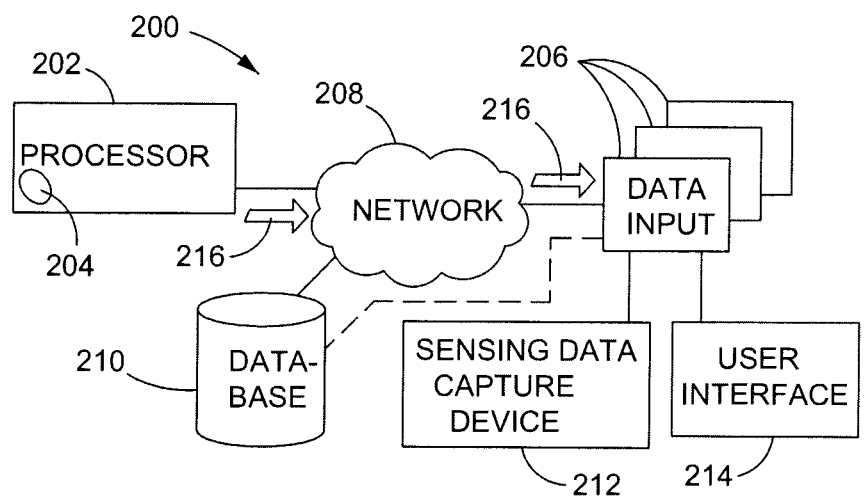
FIG. 18 is a schematic illustration of a system, having a remote processor and a network, for locating a tree having the potential to impact a structure.

FIG. 18 is a schematic illustration of a system 200 for designating vegetation, such as trees, as having the potential to impact a structure. System 200 also includes a processor 202, which may have all the attributes of processor 182 disclosed above, for example, having a storage medium 204, which may have all the attributes of storage medium 184 disclosed above. In this embodiment, the processor 202 of system 200 is configured to be a remote processor which is coupled to the data input 206 over a network 208. Data input 206 may have all the attributes of data input device 186. The network 208 may be a wired network, a wireless network, be the Internet, an intranet, an ethernet, a local area network, a wide area network, a cellular phone network, or other means for providing data communication between devices.

The processor 202 at FIG. 18 is located remotely, allowing multiple client side data inputs 206 to share the resources of, for example, the processor 202. One or more datasets, for example, LiDAR datasets, may be obtained by the data input 206 from a database 210 and/or a sensed data capture device 212 under the control of a user interface 214 coupled to the data input b. Data base 210, data capture device 212, and user interface 214 may have all the attributes of data base 190, data capture device 188, and user interface 192, respectively, disclosed above.

The one or more datasets may be transferred over the network 208 to processor 202. Processor 202 may determine a reach distance of the target vegetation and compare the reach distance of the target vegetation with a reach distance threshold value to produce a compared reach distance value. The processor 182 may also determine a health indicator value for the target vegetation and compare the health indicator value of the target vegetation with a health indicator threshold value. A health indicator value may also be determined manually. Further, the health indicator value may also be manually compared with a health indicator threshold value. The target vegetation may then be designated as having a potential to impact the structure based on the compared reach distance value and the comparison of the health indicator to the health indicator threshold. For example, the target vegetation may also be designated as having a potential to impact the structure when the reach distance is greater than or equal to the reach distance threshold and when the health indicator deviates from the health indicator threshold.

Data signals 216, having the tree health indicator data, or other data, may be transmitted to the client or user. The data transmissions in system 200 may take place over a variety of transmission media, such as wired cable, optical cable, and air. The remote processor 202 may be used to help keep the cost of the client-side hardware down, and can facilitate any upgrades to the processor 202 or to the instructions being carried out by the processor 202, since there is a central upgrade point.

FIG. 19 is a schematic illustration of a graphical user interface (GUI) 220 that may be provided for designating vegetation or trees having the potential to impact a structure, on an electronic device, according to one aspect of the invention. Suitable non-limiting examples of an electronic device include a computer, a laptop, a notebook, a personal digital assistant (PDA), and a smart phone, among others. The GUI 220 may have a dataset selection control 222 configured to provide a dataset having sensed data, for example, a LiDAR dataset. The GUI 220 may also include a target selection control 224 configured to identify the target vegetation or tree from the dataset. Some embodiments of the target selection control 224 may control or open a further GUI similar to the views illustrated in FIGS. 4, 7, and/or 9. The target selection control 224 may be further configured to identify a crown of the target tree in some embodiments.

As shown in FIG. 19, GUI 220 may also include a raster grid resolution control 226 configured to vary the resolution of grid raster overlaid upon the sensing dataset. The GUI 220 may further include a height threshold control 228 configured to control the height threshold of trees targeted by aspects of the invention. The GUI 220 may include a health threshold control 230 configured to control the health indicator value threshold of trees targeted by aspects of the invention. The GUI may include a display 238, for example, configured to display intermediate results and/or final results of the analysis, for example, be configured to display a safety buffer zone such that it can be determined from looking at the tree location on display 238 whether or not at least one tree point of interest on the target tree is liable to intersect with the safety buffer zone, for example, when at least one tree point of interest is rotated around the pivot point. The GUI 220 may optionally be provided with a safety buffer toggle control 234 configured to show or hide the safety buffer zone in the display 238. The GUI 220 may also optionally be provided with a boundary overlay control 236 which may be configured to show or hide a right-of-way (ROW) boundary in the tree location display 238. Alternate GUI embodiments may be configured to have a batch processing interface to run the segmentation and/or falling tree analysis and/or health analysis over a large number of trees when triggered by a single command.

Some or all of the above-disclosed and other features and functions, or alternatives thereof, may be desirably combined into many other different systems or applications. Various presently unforeseen or unanticipated alternatives, modifications, variations or improvements therein may be subsequently made by those skilled in the art, each of which are also intended to be encompassed by the disclosed embodiments.

The invention claimed is:

1. A method for designating vegetation as potential impact vegetation, the method comprising:
    identifying, via a processor, data relating to target vegetation from a dataset;
    determining, by the processor, a reach distance of the target vegetation, the reach distance comprising a distance from a point on a ground to a point of the target vegetation that is farthest from the point on the ground;
    comparing, by the processor, the reach distance of the target vegetation with a closest distance between the point on the ground and a structure to produce a compared reach distance value;
    determining a health indicator value for the target vegetation;
    comparing the health indicator value of the target vegetation to a health indicator threshold value; and
    designating the target vegetation as having a potential to impact the structure based on the compared reach distance value and the comparison of the health indicator to the health indicator threshold.

2. The method of claim 1, wherein the point on the ground is a point where the target vegetation grows out of the ground.

3. The method of claim 1, wherein the point on the ground is a point substantially directly below the point of the target vegetation.

4. The method of claim 1, wherein the closest distance between the point on the ground and the structure is a base distance; and
    designating the target vegetation includes designating the target vegetation as having a potential to impact the structure if the reach distance is greater than or equal to the base distance.

5. The method of claim 1, wherein the closest distance between the point on the ground and the structure is a base distance;
    designating the target vegetation includes designating the target vegetation as having a potential to impact the structure if the reach distance is greater than or equal to the base distance less a threshold distance; and
    the threshold distance is equal to a predetermined distance extending from the structure.

6. The method of claim 5, wherein the predetermined distance extending from the structure includes a value associated with a safety buffer zone, and the safety buffer zone includes at least one of a power line safety buffer zone, a railroad track safety buffer zone, a railroad overhead conductor safety buffer zone, a phone line safety buffer zone, a phone line safety buffer zone, a road safety buffer zone, a highway safety buffer zone, and a communication cable safety buffer zone.

7. The method of claim 1, wherein identifying data relating to target vegetation from a dataset includes identifying segments of the target vegetation.

8. The method of claim 6, wherein the identifying the segments includes filtering segmentation input data with a filter that alters a number of inputs to a filter operator or weights of individual entries among the inputs, based on one or more vegetation properties corresponding to a filter location.

9. The method of claim 6, wherein the identifying the segments includes, for each identified segment, altering one or more segmentation parameters of the segment based on one or more properties of a seed point from which the segment is started.

10. The method of claim 1, wherein,
determining a health indicator value for the target vegetation includes determining, by the processor, the health indicator value for the target vegetation; and
comparing the health indicator value of the target vegetation includes comparing, by the processor, the health indicator value of the target vegetation with the health indicator threshold value.

11. The method of claim 10, wherein determining a health indicator value for the target vegetation includes calculating a color difference between an analyzed pixel and a determined reference color.

12. The method of claim 11, wherein determining the health indicator value for the target vegetation further includes analyzing aerial image data that includes at least one of R-G-B image data, CIR image data, and spectrometric image data.

13. The method of claim 10, wherein the instruction to determine a health indicator value for the target vegetation includes calculating a color difference between an analyzed pixel and a determined reference color.

14. The method of claim 1, further comprising at least one of:
notifying a user of a possible impact upon the structure by the target vegetation;
displaying one or more possible points of impact upon the structure by the target vegetation;
attributing a target vegetation database with an impact table record that describes an impact between the target vegetation and the structure; and
displaying an indication that the target vegetation on a map has potential to impact the structure.

15. The method of claim 1, wherein the target vegetation comprises a tree and a tree crown, and the structure comprises a power line, a communications line, a road, or a railroad track.

16. The method of claim 1, wherein determining the health indicator value includes determining the health indicator value from at least one of imaged data of the target vegetation and field observation of the target vegetation.

17. The method of claim 1, wherein identifying data relating to target vegetation from a dataset comprises identifying the target vegetation from a dataset that includes light detection and ranging (LiDAR) data, laser scanning data, radar data, synthetic aperture radar data, data from a sensor based on scanning distance-measurement and providing point clouds, digital imagery, video, or hyperspectral imaging data.

18. A tangible computer readable storage medium, including instructions for instructing a processor to:
identify data relating to target vegetation from a dataset;
determine a reach distance of the target vegetation, the reach distance comprising a distance from a point on the ground to a point of the target vegetation that is farthest from the point on the ground;
compare the reach distance of the target vegetation with a closest distance between the point on the ground and a structure to produce a compared reach distance value;
determine a health indicator value for the target vegetation;
compare the health indicator value of the target vegetation with a health indicator value threshold; and
designate the target vegetation as having a potential to impact the structure based on the compared reach distance value and the comparison of the health indicator to the health indicator threshold.

19. The storage medium of claim 18, wherein the closest distance between the point on the ground and the structure is a base distance; and
the instruction to designate the target vegetation includes designating the target vegetation as having a potential to impact the structure if the reach distance is greater than or equal to the base distance.

20. The method of claim 18, wherein the closest distance between the point on the ground and the structure is a base distance;
the instruction to designate the target vegetation includes designating the target vegetation as having a potential to impact the structure if the difference between the base distance and the reach distance is greater than or equal to a threshold distance; and
the threshold distance is equal to a predetermined distance extending from the structure.

21. The method of claim 18, wherein the instruction to identify data relating to target vegetation from a dataset includes designating segments of the target vegetation.

22. The method of claim 21, wherein designating segments of the target vegetation includes adaptive filtering.

23. The method of claim 21, wherein designating segments of the target vegetation includes adaptive thresholding.

24. A system for designating vegetation as potential impact target vegetation, comprising:
a processor configured to:
identify data relating to target vegetation from a dataset;
determine a reach distance of the target vegetation, the reach distance comprising a distance from a point on the ground to a point of the target vegetation that is farthest from the point on the ground;
compare the reach distance of the target vegetation with a closest distance between the point on the ground and a structure to produce a compared reach distance value;
determine a health indicator value for the target vegetation;
compare the health indicator value of the target vegetation with a health indicator value threshold; and
designate the target vegetation as having a potential to impact the structure if the reach distance is greater than or equal to the reach distance threshold and if the health indicator deviates from the health indicator threshold;
a data input coupled to the processor and configured to provide the processor with the dataset; and
a user interface coupled to at least one of the processor and the data input.

25. The system of claim 24, further comprising a data sensing device selected from a group comprising a light detection and ranging (LiDAR) system, a laser scanning system, a radar system, a synthetic aperture radar system, a system using a sensor based on scanning distance-measurement and providing 3D point clouds, a digital imaging system, and a hyperspectral imaging system.

26. The system of claim 24, wherein the structure includes at least one of a power line, a railroad track, a railroad overhead conductor, a phone line, a phone line, a road, a highway, and a communication cable.

27. The system of claim 24, wherein the processor is further configured to select at least one action from a group of actions comprising:
- notifying a user of a possible impact upon the structure by the target vegetation;
- displaying one or more possible points of impact upon the structure by the target vegetation;
- attributing a target vegetation database with an impact table record that describes an impact between the target vegetation and the structure; and
- displaying an indication that the target vegetation on a map has potential to impact the structure.

* * * * *